US012008651B2

(12) United States Patent
Pechenik et al.

(10) Patent No.: US 12,008,651 B2
(45) Date of Patent: Jun. 11, 2024

(54) VIRTUAL OVER-THE-COUNTER FINANCIAL PRODUCT EXCHANGE SYSTEM

(71) Applicant: YellowJacket, Inc., New York, NY (US)

(72) Inventors: Jacob Pechenik, Woodside, NY (US); Gregory Campbell, Redondo Beach, CA (US)

(73) Assignee: ICE Data, LP, Atlanta, GA (US)

( * ) Notice: Subject to any disclaimer, the term of this patent is extended or adjusted under 35 U.S.C. 154(b) by 0 days.

(21) Appl. No.: 16/720,140

(22) Filed: Dec. 19, 2019

(65) Prior Publication Data

US 2020/0126159 A1  Apr. 23, 2020

Related U.S. Application Data

(62) Division of application No. 11/186,651, filed on Jul. 21, 2005, now Pat. No. 10,552,908.

(51) Int. Cl.
*G06Q 40/06* (2012.01)
*G06Q 40/03* (2023.01)
*G06Q 40/04* (2012.01)

(52) U.S. Cl.
CPC ............. *G06Q 40/06* (2013.01); *G06Q 40/03* (2023.01); *G06Q 40/04* (2013.01)

(58) Field of Classification Search
None
See application file for complete search history.

(56) References Cited

U.S. PATENT DOCUMENTS

| 5,339,392 A | 8/1994 | Risberg et al. |
| 5,675,746 A | 10/1997 | Marshall |

(Continued)

FOREIGN PATENT DOCUMENTS

| JP | 2001351026 A | 12/2001 |
| JP | 2005242400 A | 8/2005 |

OTHER PUBLICATIONS

"XML Price Stream Technical Summary Version 1.3, A. Urzica and NPapadimitriou," Feb. 6, 2003.

(Continued)

*Primary Examiner* — William J Jacob
(74) *Attorney, Agent, or Firm* — DLA Piper LLP (US)

(57) ABSTRACT

A virtual over-the-counter exchange system that allows brokers to negotiate and complete exchanges of financial products between traders within a plurality of financial product markets includes a data converter that converts financial product market information received from a broker into a standard financial product data format, a virtual broker database that stores the financial product market information in the standard financial product data format, a plurality of virtual trader databases, each virtual trader database storing, in the standard financial product data format, at least a portion of the financial product market information selected by the broker to be distributed to a corresponding one of a plurality of traders, and a data distributor that distributes the at least a portion of the financial product market information in each of the virtual trader databases to a corresponding one of the plurality of traders in one of a plurality of proprietary formats.

26 Claims, 27 Drawing Sheets

(56) References Cited

U.S. PATENT DOCUMENTS

| | | | |
|---|---|---|---|
| 5,799,151 A | 8/1998 | Hoffer | |
| 5,809,483 A * | 9/1998 | Broka | G06Q 40/04 |
| | | | 705/37 |
| 6,029,146 A | 2/2000 | Hawkins et al. | |
| 6,064,984 A * | 5/2000 | Ferguson | G06Q 40/06 |
| | | | 715/209 |
| 6,317,727 B1 * | 11/2001 | May | G06Q 40/03 |
| | | | 705/36 R |
| 6,378,982 B2 | 4/2002 | Ono et al. | |
| 6,408,282 B1 | 6/2002 | Buist | |
| 6,421,653 B1 | 7/2002 | May | |
| 6,766,304 B2 | 7/2004 | Kemp, II et al. | |
| 6,769,009 B1 | 7/2004 | Reisman | |
| 7,451,108 B1 * | 11/2008 | Skuriat | G06Q 10/0639 |
| | | | 705/37 |
| 7,685,048 B1 * | 3/2010 | Hausman | G06Q 40/04 |
| | | | 705/37 |
| 2001/0027437 A1 | 10/2001 | Turbeville et al. | |
| 2001/0049651 A1 | 12/2001 | Selleck | |
| 2002/0002530 A1 | 1/2002 | May | |
| 2002/0023040 A1 | 2/2002 | Gilman et al. | |
| 2002/0032643 A1 | 3/2002 | Himmelstein | |
| 2002/0032644 A1 * | 3/2002 | Corby | G06Q 40/08 |
| | | | 705/37 |
| 2002/0038278 A1 | 3/2002 | Himmelstein | |
| 2002/0042764 A1 * | 4/2002 | Gardner | G06Q 40/03 |
| | | | 705/35 |
| 2002/0049667 A1 | 4/2002 | Navani et al. | |
| 2002/0052769 A1 | 5/2002 | Navani et al. | |
| 2002/0069210 A1 | 6/2002 | Navani et al. | |
| 2002/0120547 A1 | 8/2002 | Zajac | |
| 2002/0120555 A1 | 8/2002 | Lerner | |
| 2002/0138400 A1 | 9/2002 | Kitchen et al. | |
| 2002/0169658 A1 * | 11/2002 | Adler | G06Q 10/06 |
| | | | 705/7.29 |
| 2002/0184337 A1 | 12/2002 | McFeely | |
| 2003/0018569 A1 * | 1/2003 | Eisenthal | G06Q 40/04 |
| | | | 705/37 |
| 2003/0033212 A1 * | 2/2003 | Sandhu | G06Q 40/06 |
| | | | 705/26.1 |
| 2003/0055776 A1 | 3/2003 | Samuelson | |
| 2003/0088499 A1 | 5/2003 | Gilbert et al. | |
| 2004/0024692 A1 | 2/2004 | Turbeville et al. | |
| 2004/0230519 A1 | 11/2004 | Parker | |
| 2004/0236669 A1 | 11/2004 | Horst et al. | |
| 2007/0643653 | 2/2007 | Hughes et al. | |
| 2007/0265956 A1 | 11/2007 | Epstein et al. | |
| 2008/0010221 A1 * | 1/2008 | Co | G06Q 40/06 |
| | | | 705/36 R |
| 2008/0281750 A1 * | 11/2008 | Toffey | G06Q 40/03 |
| | | | 705/37 |
| 2008/0288329 A1 * | 11/2008 | Nannis | G06Q 40/04 |
| | | | 705/36 R |
| 2008/0306864 A1 | 12/2008 | Foley et al. | |
| 2009/0171969 A1 * | 7/2009 | Ristock | G06F 16/256 |
| 2010/0185559 A1 * | 7/2010 | May | G06Q 30/08 |
| | | | 705/37 |
| 2011/0004560 A1 * | 1/2011 | Knake | G06Q 50/16 |
| | | | 705/313 |

OTHER PUBLICATIONS

"XML Standards for Financial Services" A. Malik, Mar. 26, 2003.
"A New XML Standard for Weather Derivatives Transactions Propose Wall Street Technology." Dec. 2, 2003.

* cited by examiner

FIG. 3

| Market Structures (Column A) are made up of the following components (Columns C-N) | | | | | | | | | | | | |
|---|---|---|---|---|---|---|---|---|---|---|---|---|
| SWAP | | Location 1 | Location 2 | Start Date | End Date | Index | Units | Strike 1 | Tick 1 | Limit 1 | Strike 2 | Tick 2 |
| SPREAD SWAP | | Location 1 | Location 2 | Start Date | End Date | Index | Units | Strike 1 | Tick 1 | Limit 1 | Strike 2 | Tick 2 |
| CALL | | Location 1 | Location 2 | Start Date | End Date | Index | Units | Strike 1 | Tick 1 | Limit 1 | Strike 2 | Tick 2 |
| PUT | | Location 1 | Location 2 | Start Date | End Date | Index | Units | Strike 1 | Tick 1 | Limit 1 | Strike 2 | Tick 2 |
| SPREAD CALL | | Location 1 | Location 2 | Start Date | End Date | Index | Units | Strike 1 | Tick 1 | Limit 1 | Strike 2 | Tick 2 |
| SPREAD PUT | | Location 1 | Location 2 | Start Date | End Date | Index | Units | Strike 1 | Tick 1 | Limit 1 | Strike 2 | Tick 2 |
| STRANGLE | | Location 1 | Location 2 | Start Date | End Date | Index | Units | Strike 1 | Tick 1 | Limit 1 | Strike 2 | Tick 2 |
| SPREAD STRANGLE | | Location 1 | Location 2 | Start Date | End Date | Index | Units | Strike 1 | Tick 1 | Limit 1 | Strike 2 | Tick 2 |
| COLLAR | | Location 1 | Location 2 | Start Date | End Date | Index | Units | Strike 1 | Tick 1 | Limit 1 | Strike 2 | Tick 2 |
| SPREAD COLLAR | | Location 1 | Location 2 | Start Date | End Date | Index | Units | Strike 1 | Tick 1 | Limit 1 | Strike 2 | Tick 2 |
| STRADDLE | | Location 1 | Location 2 | Start Date | End Date | Index | Units | Strike 1 | Tick 1 | Limit 1 | Strike 2 | Tick 2 |
| SPREAD STRADDLE | | Location 1 | Location 2 | Start Date | End Date | Index | Units | Strike 1 | Tick 1 | Limit 1 | Strike 2 | Tick 2 |
| ZERO COLLAR | | Location 1 | Location 2 | Start Date | End Date | Index | Units | Strike 1 | Tick 1 | Limit 1 | Strike 2 | Tick 2 |
| SPREAD ZERO COLLAR | | Location 1 | Location 2 | Start Date | End Date | Index | Units | Strike 1 | Tick 1 | Limit 1 | Strike 2 | Tick 2 |
| CALL SPREAD | | Location 1 | Location 2 | Start Date | End Date | Index | Units | Strike 1 | Tick 1 | Limit 1 | Strike 2 | Tick 2 |
| PUT SPREAD | | Location 1 | Location 2 | Start Date | End Date | Index | Units | Strike 1 | Tick 1 | Limit 1 | Strike 2 | Tick 2 |
| SPREAD CALL SPREAD | | Location 1 | Location 2 | Start Date | End Date | Index | Units | Strike 1 | Tick 1 | Limit 1 | Strike 2 | Tick 2 |
| SPREAD CALL SPREAD | | Location 1 | Location 2 | Start Date | End Date | Index | Units | Strike 1 | Tick 1 | Limit 1 | Strike 2 | Tick 2 |
| CALL CROSS | | Location 1 | Location 2 | Start Date | End Date | Index | Units | Strike 1 | Tick 1 | Limit 1 | Strike 2 | Tick 2 |
| PUT CORSS | | Location 1 | Location 2 | Start Date | End Date | Index | Units | Strike 1 | Tick 1 | Limit 1 | Strike 2 | Tick 2 |
| SPREAD CALL CROSS | | Location 1 | Location 2 | Start Date | End Date | Index | Units | Strike 1 | Tick 1 | Limit 1 | Strike 2 | Tick 2 |
| SPREAD PUT CROSS | | Location 1 | Location 2 | Start Date | End Date | Index | Units | Strike 1 | Tick 1 | Limit 1 | Strike 2 | Tick 2 |

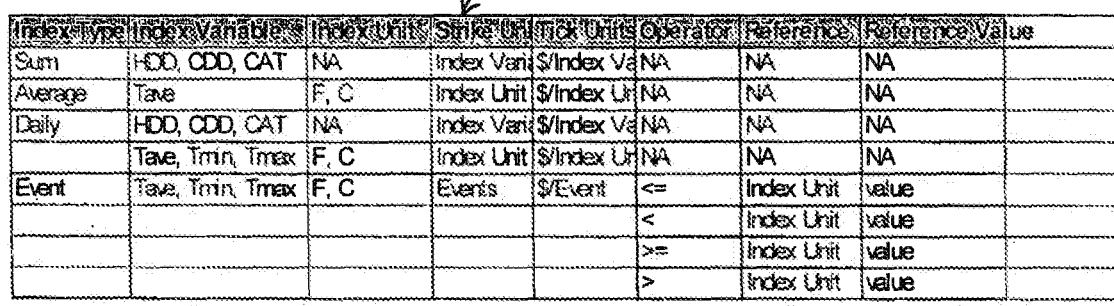

| Index Type | Index Variables | Index Unit | Strike Unit | Tick Units | Operator | Reference | Reference Value |
|---|---|---|---|---|---|---|---|
| Sum | HDD, CDD, CAT | NA | Index Vari | $/Index Va | NA | NA | NA |
| Average | Tave | F, C | Index Unit | $/Index Un | NA | NA | NA |
| Daily | HDD, CDD, CAT | NA | Index Vari | $/Index Va | NA | NA | NA |
|  | Tave, Tmin, Tmax | F, C | Index Unit | $/Index Un | NA | NA | NA |
| Event | Tave, Tmin, Tmax | F, C | Events | $/Event | <= | Index Unit | value |
|  |  |  |  |  | < | Index Unit | value |
|  |  |  |  |  | >= | Index Unit | value |
|  |  |  |  |  | > | Index Unit | value |

VIRTUAL OVER-THE-COUNTER FINANCIAL PRODUCT EXCHANGE SYSTEM

TECHNICAL FIELD

The present invention generally relates to computer systems for trading and analyzing derivative products, and more particularly, software that aggregates and integrates derivative products trading information from various broker networks.

BACKGROUND

Derivatives can be traded either on an exchange or off-exchange. Derivatives traded on an exchange are called exchange-traded derivatives. The primary purpose of exchanges is to provide contract standardization, anonymity, a clearing system, and a large number of participants in order to provide liquidity in a contract.

Contracts entered into through private negotiation are typically called off-exchange or Over-The-Counter (OTC) derivatives. OTC markets allow the creation of products whose risk-return characteristics closely match the needs of individual customers. Additionally, OTC markets address privacy concerns when participants do not want the terms of their trade or prospective trade advertised to the broader market.

When dealing in OTC markets, brokers typically quote custom derivative products to dealers via phone or instant messaging. This conventional method has many disadvantages. For example, when instant messaging a product to a group of dealers (traders), not every dealer will receive the product at the same time, which creates unfair advantage to those dealers who receive the product first. Also, when a product is sent to a dealer, the dealer does not immediately know if the product is new or is an update of a previous product. Further, brokers often send products out in varying formats, so that the dealer must then reformat the product information into a format that can be incorporated into the dealer's analysis system. In this regard, dealers must be able to quickly analyze a large amount of data, and thus having to compose product data into spreadsheets or otherwise reformat the data before any analysis begins is a clear disadvantage.

In OTC markets, traders are faced with the burdensome task of gathering, deciphering and consolidating all information on quoted products. In this regard, traders deal with products coming from multiple brokers and in differing formats. Also, traders conventionally have no dynamic, aggregated view of the market across brokers that updates in real-time as markets move. If the trader is away from his desk or otherwise busy, it is difficult to catch up on market events.

Another disadvantage of OTC markets is that dealers have a difficult time performing market-to-market portfolio valuation which is required to monitor profit and loss and risk exposure because of the OTC market's lack of a centralized source for current and historical prices. Further, corporate scandals demand OTC market participants have an independently auditable accounting system that marginalizes instances of non-representative pricing and data manipulation.

In general, OTC markets offer difficulties to all parties involved in such markets. For example, dealers do not have access to data for obtaining current prices of financial products or for testing trading models. Profit and loss and risk management personnel do not have access to data for price verification or to update the value of a portfolio. Further, in OTC markets, it is difficult to maintain records for compliance or for settlement of disputes.

Weather derivatives are one type of derivative typically exchanged in OTC markets. A weather derivative is a financial product whose payoff is based on a specified measured weather metric and is used to hedge the financial impact of weather fluctuations. Utility companies, such as individual power and utility companies, typically use weather derivatives as price and volumetric hedges to smooth their earnings. Other entities that use weather derivatives includes banks, hedge funds and re-insurance companies, to name a few.

Just as an option on a commodity has as its underlying asset the price of a futures contract, a weather derivative has as its underlying "asset", a weather measure. A majority of weather derivatives traded in the U.S. are based on Heating Degree Days (HDD) or Cooling Degree Days (CDD), which are two different measures of temperature. An HDD is the number of degrees by which the day's average temperature is below a base temperature (usually 65 degrees Fahrenheit), while a CDD is the number of degrees by which the day's temperature is above the base temperature. Most weather contracts are written on the accumulation of HDDs and CCDs over a calendar month or a season so that one contract can hedge against revenue fluctuations over the concerned period. Weather derivatives can also be based on precipitation, humidity, wind speed or any other measurable weather metric In general, there are three types of temperature derivatives, namely, futures/forward, swaps, and options. Besides the underlying variable HDD and CDD, a weather contract must specify such basic elements as the accumulation period, the underlying variable (weather metric) to be measured, the index station, or stations, which records the metric used to construct the underlying variable (typically, an airport), the tick size, i.e., the dollar amount attached to each unit of the underlying variable, and the strike price.

Although weather derivatives are effective hedging tools for energy and utility companies, they suffer the same disadvantages as other OTC derivatives. Accordingly, there is a need for a virtual OTC exchange that allows brokers and traders to input and track updates on financial products in real time and that provides an individualized communication protocol between each broker and trader, and allows a trader to view all current OTC quoted markets in a single consolidated screen.

SUMMARY OF THE INVENTION

It is an object of the present invention to provide a system for integrating, organizing and displaying derivatives market information from multiple brokers and electronic exchanges in real time.

It is another object of the present invention to provide a means to translate financial product information input by brokers and the computer protocol of each participating electronic exchange to a common format and protocol.

It is also an object of the present invention to provide on screen a real time display of individual bids and offers from a plurality of traders.

It is also an object of the present invention to provide a system by which financial product information can be transmitted to traders through the Internet or via any other form of network for display and execution.

A virtual over-the-counter exchange system that allows brokers to negotiate and complete exchanges of financial products between traders within a plurality of financial product markets according to an exemplary embodiment of the invention includes a data interface having a data converter and a data distributor, the data converter converting financial product information received from a broker into a standard financial product data format; a virtual broker database that stores the financial product information in the standard financial product data format; and a plurality of virtual trader databases, each virtual trader database storing, in the standard financial product data format, at least a portion of the financial product information selected by the broker to be distributed to a corresponding one of a plurality of traders, the data distributor converting the at least a portion of the financial product information in each of the virtual trader databases into a corresponding one of a plurality of formats and distributing the at least a portion of the financial product information in each of the virtual trader databases to a corresponding one of the plurality of traders in one of the plurality of formats.

In at least one embodiment, the formats are selected to allow for distribution of the at least a portion of the financial product information to an e-mail system, an instant messaging system, a spreadsheet system or a proprietary trader graphical interface.

In at least one embodiment, the system further includes a broker graphical interface that displays and allows for input of financial product information by the broker to the virtual broker database, including financial product information relating to terms and structure of a plurality of financial products.

In at least one embodiment, the financial product information includes bid, offer and trade information relating to the plurality of financial products.

In at least one embodiment, the trader graphical interface allows a corresponding trader to enter a request for the broker to enter, edit or delete bid or offer information.

In at least one embodiment, the financial product information includes historical data pertaining to each of the plurality of financial products.

A virtual over-the-counter exchange system that allows brokers to negotiate and complete exchanges of financial products between traders within a plurality of financial product markets according to an exemplary embodiment of the invention includes a broker interface that displays and allows for input of a primary set of data relating to a plurality of financial products handled by a broker, including data relating to terms and structure of the plurality of financial products; a broker virtual database that stores the primary set of data relating to each of the financial products; a trader virtual database corresponding to a trader that stores a secondary set of data relating to at least one of the plurality of financial products, the secondary set of data being based on at least one of the primary sets of data relating to the at least one of the plurality of financial products and additional data, relating to the at least one of the plurality of financial products, distributed by the broker to the trader; and a trader interface that displays the secondary set of data relating to the at least one of the plurality of financial products.

In at least one embodiment, the broker interface includes a product creation wizard that allows the broker to input data relating to the structure of each of the plurality of financial products to the broker interface.

In at least one embodiment, for each financial product, the product creation wizard provides generic input fields for input of generic data regarding the financial product structure.

In at least one embodiment, for each financial product, the product creation wizard provides specific input fields for input of specific data regarding the financial product structure, where the specific input fields depend on the information input to the generic input fields.

In at least one embodiment, the primary set of data includes bid data, and the broker interface further includes, for each financial product, an add bid interface that allows the broker to input bid data relating to the financial product.

In at least one embodiment, the primary set of data includes offer data, and the broker interface further includes, for each financial product, an add offer interface that allows the broker to input offer data relating to the financial product.

In at least one embodiment, the broker interface further includes, for each financial product, a bid edit menu that allows the broker to edit, add, pause or delete the bid data relating to the financial product.

In at least one embodiment, the broker interface further includes, for each financial product, an offer edit menu that allows the broker to edit, add, pause or delete the offer data relating to the financial product.

In at least one embodiment, the broker interface further includes a navigational bar that allows the broker to cat-egorically choose which financial products to display in the broker interface.

In at least one embodiment, the broker interface further includes an instant messaging screen, and the navigational bar allows the broker to initiate communication with a plurality of contacts listed in the navigational bar via the instant messaging screen.

In at least one embodiment, for each financial product, a plurality of financial product update buttons may be used for selecting which contacts to send the information regarding the financial product market.

In at least one embodiment, the trader interface includes an add offer interface that allows the trader to request the broker to input offer data relating to the at least one financial product.

In at least one embodiment, the request to add an offer to the at least one financial product appears in the instant messaging screen of the broker interface.

In at least one embodiment, trader interface includes an add bid interface that allows the trader to request the broker to input bid data relating to the at least one financial product.

In at least one embodiment, the request to add a bid to the at least one financial product appears in the instant messaging screen of the broker interface.

In at least one embodiment, the trader interface includes a bid/offer edit request menu that allows the trader to request edit, pause or deletion of bid or offer data relating to the at least one financial product.

In at least one embodiment, the request from the trader to edit a bid/offer relating to the at least one financial product appears in the instant messaging screen of the broker interface.

In at least one embodiment, the trader interface further includes a navigational bar that allows the trader to choose which financial product markets to display in the trader interface.

In at least one embodiment, the trader interface includes an instant messaging screen, and the navigational bar allows the trader to initiate communication with a plurality of contacts listed in the navigational bar via the instant messaging screen.

A virtual over-the-counter exchange system that allows a plurality of brokers to negotiate and complete exchanges of financial products between traders within a plurality of financial instrument product markets according to an exemplary embodiment of the invention includes a plurality of virtual broker databases, each of the virtual broker databases corresponding to a respective one of a plurality of brokers and storing information relating to a plurality of financial products, including information related to market structure, handled by the respective one of the plurality of brokers; a plurality of broker interfaces, each of the plurality of broker interfaces corresponding to a respective one of the plurality of broker databases and displaying the information stored in the respective one of the plurality of broker databases for viewing by the corresponding one of the plurality of brokers; and a plurality of virtual trader databases, each of the plurality of virtual trader databases corresponding to a respective one of a plurality of traders and storing at least a portion of the information relating to at least one of the plurality of financial product markets handled by the respective one of the plurality of brokers that selects the respective one of the plurality of traders to receive the information.

In at least one embodiment, the system further includes a plurality of trader interfaces, each of the plurality of trader interfaces corresponding to a respective one of the plurality of virtual trader databases and displaying the at least a portion of the information stored in the respective one of the plurality of trader databases.

A method for generating a virtual over-the-counter exchange that allows brokers and traders to negotiate and complete exchanges of financial products according to an exemplary embodiment of the invention includes displaying within a broker interface a primary set of data relating to a plurality of financial products handled by a broker, storing the primary set of data relating to each of the financial products in a broker database, and storing a secondary set of data relating to at least one of the plurality of financial products in a trader database, the second set of data being based on at least one of the primary sets of data and additional data distributed by the broker to the trader.

In at least one embodiment, the method further includes a step of generating a text string, based on pre-defined rules, that represents a financial product structure, for each of the plurality of financial products based on input to the broker interface.

In a processor readable storage medium containing processor readable code for programming a processor to perform a method for generating a virtual over-the-counter exchange that allows brokers and traders to negotiate and complete exchanges of financial products according to an exemplary embodiment of the invention, the method includes the steps of converting financial product information received from a broker into a standard financial product data format; storing the financial product information in the standard financial product data format in a virtual broker database; storing in each of a plurality of virtual trader databases at least a portion of the financial product information selected by the broker to be distributed to a corresponding one of a plurality of traders in the standard financial product data format; and distributing the at least a portion of the financial product information in each of the virtual trader databases to a corresponding one of the plurality of traders in one of a plurality of proprietary formats.

These and other features of this invention are described in, or are apparent from, the following detailed description of various exemplary embodiments of this invention.

BRIEF DESCRIPTION OF THE DRAWINGS

Various exemplary embodiments of this invention will be described in detail, with reference to the following figures, wherein:

FIG. 3 is a screen shot of a broker graphical interface according to an exemplary embodiment of the invention.

FIG. 7 shows a table listing the various types of financial products useable with the system according to an exemplary embodiment of the present invention;

FIG. 9 shows a table listing the various index types useable with the system according to an exemplary embodiment of the present invention;

FIG. 10 shows a navigational bar provided in a broker interface according to an exemplary embodiment of the present invention;

FIG. 13 shows an add offer interface provided in a broker interface according to an exemplary embodiment of the present invention;

FIG. 14 shows a broker bid/offer edit menu provided in a broker interface according to an exemplary embodiment of the present invention;

FIG. 17 shows a screenshot of a paused market in a broker interface according to an exemplary embodiment of the present invention;

FIG. 18 shows a basket creation interface provided in a broker interface according to an exemplary embodiment of the present invention;

FIG. 19 is a screenshot of a trader graphical interface according to an exemplary embodiment of the present invention;

FIG. 21 is a screenshot of the trader graphical interface of FIG. 19 after a bid or offer is selected;

FIG. 22 shows a add bid input interface provided in a trader interface according to an exemplary embodiment of the present invention;

FIG. 23 is a screenshot of the trader graphical interface of FIG. 19 after a market had been updated;

FIG. 24 shows a trader bid/offer edit menu provided in a trader interface according to an exemplary embodiment of the present invention;

FIG. 26 shows a navigational bar provided in a trader interface according to an exemplary embodiment of the present invention.

DETAILED DESCRIPTION OF PREFERRED EMBODIMENTS

The various exemplary embodiments of the present invention are directed to a virtual over-the-counter exchange system which allows brokers to input product data to a virtual broker database via a broker interface, such as a broker whiteboard. In essence, the broker whiteboard functions as a "sub-exchange", with each product functioning as a market within the sub-exchange. Information regarding each market may than be sent to traders and accessed through individual trader whiteboards or by receiving personalized messages via instant messaging, e-mail, etc. A trader receives information only from those brokers which have the trader on their distribution list within a particular market. Thus, a trader may have access to information regarding multiple financial products available from a variety of brokers. For each trader, an individualized trader database may be maintained that stores the information regarding the financial products to which the trader has access. The system of the present invention is particularly useful for trading of weather products, although the system is equally applicable to any of a number of other types of products. Thus, although the present invention will be described herein within the context of weather products, it should be appreciated that the system provides particular advantages when used in any type of OTC market because of its ability to provide significant automation of activity typically performed over the phone or via instant messenger.

In the following description, the term "clicking" is intended to mean positioning a cursor over an item, such as a button, in a graphical user interface and physically pressing a mouse button to select the item in the graphical user interface. Further, the term "right click" refers to physically pressing the right button on a computer mouse to select an item in a graphical user interface. However, it should be appreciated that the method of selecting an item in the graphical user interfaces discussed herein is not limited to the use of a mouse, and that any other method of item selection may be used, such, as for example, by providing a touch-sensitive display.

Further, the term "broker" is intended to encompass individual brokers as well as groups of brokers that share common information regarding financial products and traders, such as brokers in a brokerage house. Similarly, the term "trader" is intended to encompass individual traders as well as groups of traders sharing common information.

Figure 1:
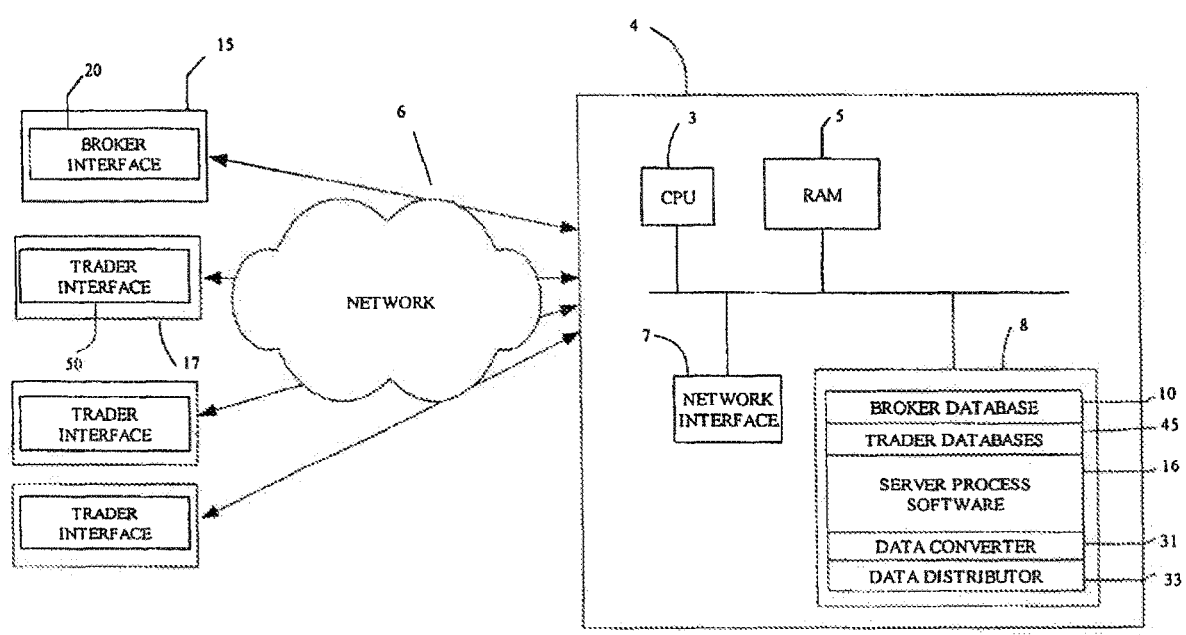
FIG. 1 shows a computer based system for establishing a virtual over-the-counter exchange according to an exemplary embodiment of the invention.

FIG. 1 shows a computer based system 1 for establishing a virtual OTC exchange according to an exemplary embodiment of the invention. The system 1 in this embodiment includes a broker client computer 15 and a plurality of trader client computers 17 connected to a server computer 4 over a wide area network 6, such, for example, the Internet. Although only one broker client computer 15 and three trader client computers 17 are shown in FIG. 1, it should be appreciated that in other embodiments of the invention the computer based system 1 may include any number of broker and trader client computers. In exemplary embodiment of the invention, when a user at a client computer 15, 17 logs into the server computer 4 using login information, the server computer 4 is able to determine whether to send broker information or trader information to the user based on the login information. The server computer 4 includes a central processing unit (CPU) 3, a primary memory (i.e., RAM) 5, a network interface 7, and a secondary memory 8. The secondary memory 8 is preferably disk storage. Code is stored in the secondary memory 8 for performing a plurality of processes, executable by the CPU 3, which function together to establish a virtual exchange for OTC traded derivatives, such as, for example, weather derivatives. Alternatively, each of the processes may run on a separate hardware element of the server computer 4. As will be explained in further detail below, the client computers 15, 17 may be located at brokerage houses or trader workstations, where broker or trader whiteboards are displayed for easy viewing and manipulation of financial product data.

Figure 2:
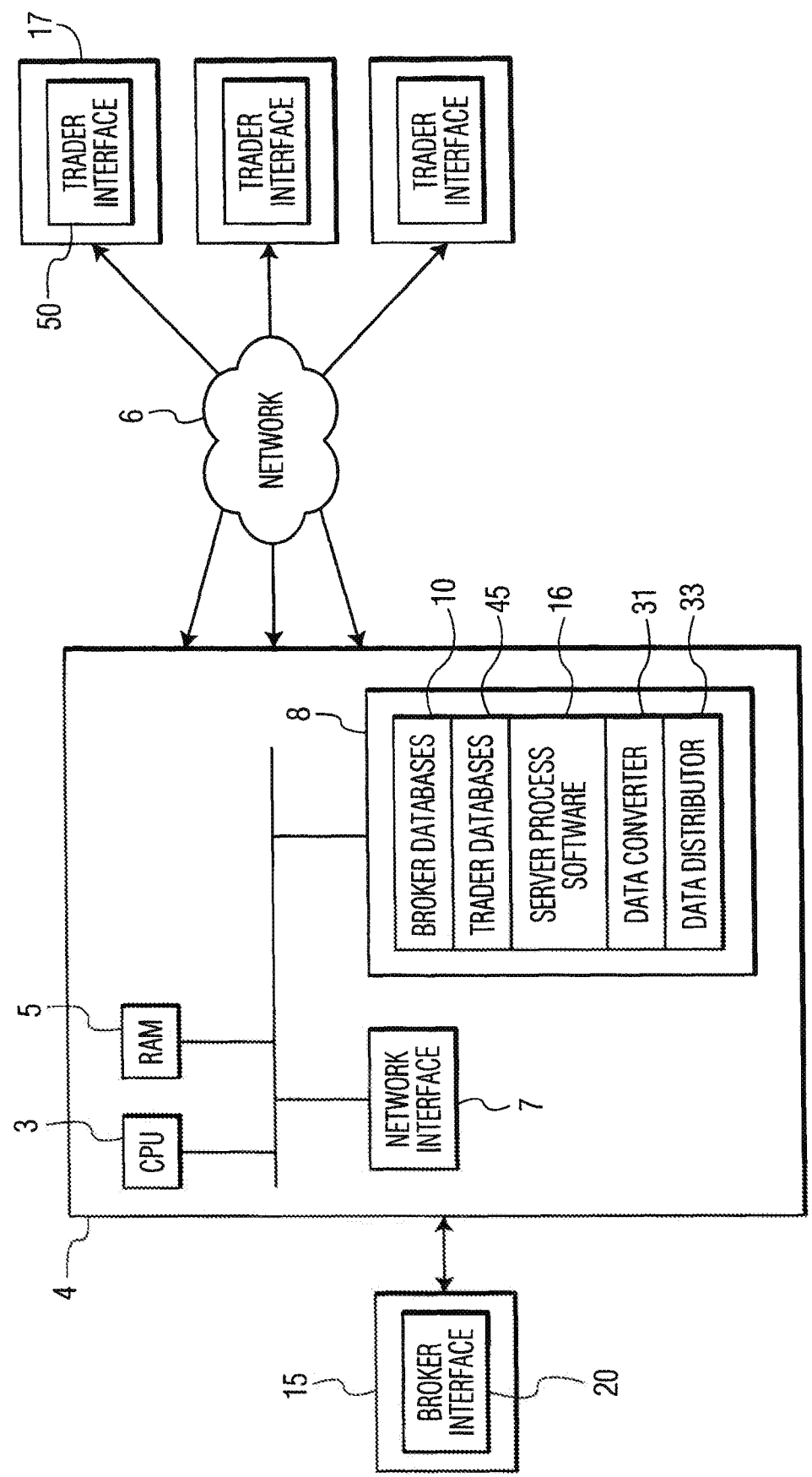
FIG. 2 shows a computer based system for establishing a virtual over-the-counter exchange according to another exemplary embodiment of the invention.

As shown in FIG. 2, in an alternative embodiment of the invention, a plurality of trader client computers 17 are connected via a wide area network (WAN). The server computer 4 is local to the broker client computer 15, and information may be exchanged between the broker client computer 15 and the trader client computer 17 over a wide area network 6, such as, for example, the Internet. Alternatively, the server computer 4 may be local to the trader client computers 17, and the broker client computer 15 may communicate with the server computer 4 over the Internet. In either embodiment, the server computer 4 may provide an instant messaging gateway, which allows users of the client computers 15, 17 to communicate with one another via instant messaging, such as, for example, AOL Instant Messenger, Yahoo! Messenger and Jabber.

Stored in the secondary memory 8 are one or more of a plurality of broker virtual databases 10, one or more of a plurality of virtual trader databases 10, and server process software 16. The server process software 16 contains logic to receive requests from the broker client computer 15 and the trader client computer 17 to commit, receive and distribute data to and from a broker interface 20 located at the broker client computer, the trader interface 50 located at the trader client computer 17, the broker database 10 and the trader database 45.

The broker database 10 may include "master" information relating to, for example, each trader-client, each product listed, bids and/or offers on all products, a history of bid and/or offer and trade updates for each product, specific details on broker-trader relationships, and preferred format of product data when sent in string format to a particular trader. In general, the broker database 10 preferably contains historical information which a broker may later use to determine to which traders they should send information regarding an product and how the information is to be transferred. The broker database 10 contains data that can later be analyzed and re-purposed to provide insight into trader preferences and trading behavior. This data can be used to automatically associate traders with markets they are likely to be interested in based on previous interest. Both the broker database 10 and the trader databases 45 store financial product data information in a standard format, preferably one from which customized text-based market descriptions can easily be created. The data string representing each of the financial products can be distributed to traders as financial product information updates via instant messaging or email, for example.

The server process software 16 may include a data converter 31 and a data distributor 33. The data converter 31 contains logic to translate financial product information received from a broker interface 20 into a standard data protocol for storage in the virtual broker database 10. In this regard, the data converter is preferably an application program interface (API) which allows for communication between the client computers 15 and the server computer 4 by providing a number of server controllers. Thus, any suitable broker interface 20 may be used to interact with the server software as long as it is configured to the requirements of the API. The data distributor 33 distributes financial product information stored in each of the virtual trader databases 45 to a corresponding one of the plurality of trader interfaces 50 in one of a plurality of proprietary formats. For example, the trader interface 50 may be an e-mail system, in which case the data distributor 33 would translate the data stored in the virtual trader databases 45 into text for sending using SMTP protocol. The previously mentioned API is preferably used for communication between any type of trader interface system and the server computer 4. The data distributor 45 also determines whether the trader is available to receive financial product information either through a proprietary graphical interface, an example of which is discussed below, or via any other type of communications means, such as instant messaging or e-mail, and determines the proper data protocol for distribution based on the trader's availability. The trader interface 50 may include any suitable communication means, as long as such means is configured to the requirements of the previously mentioned API.

Figure 3:
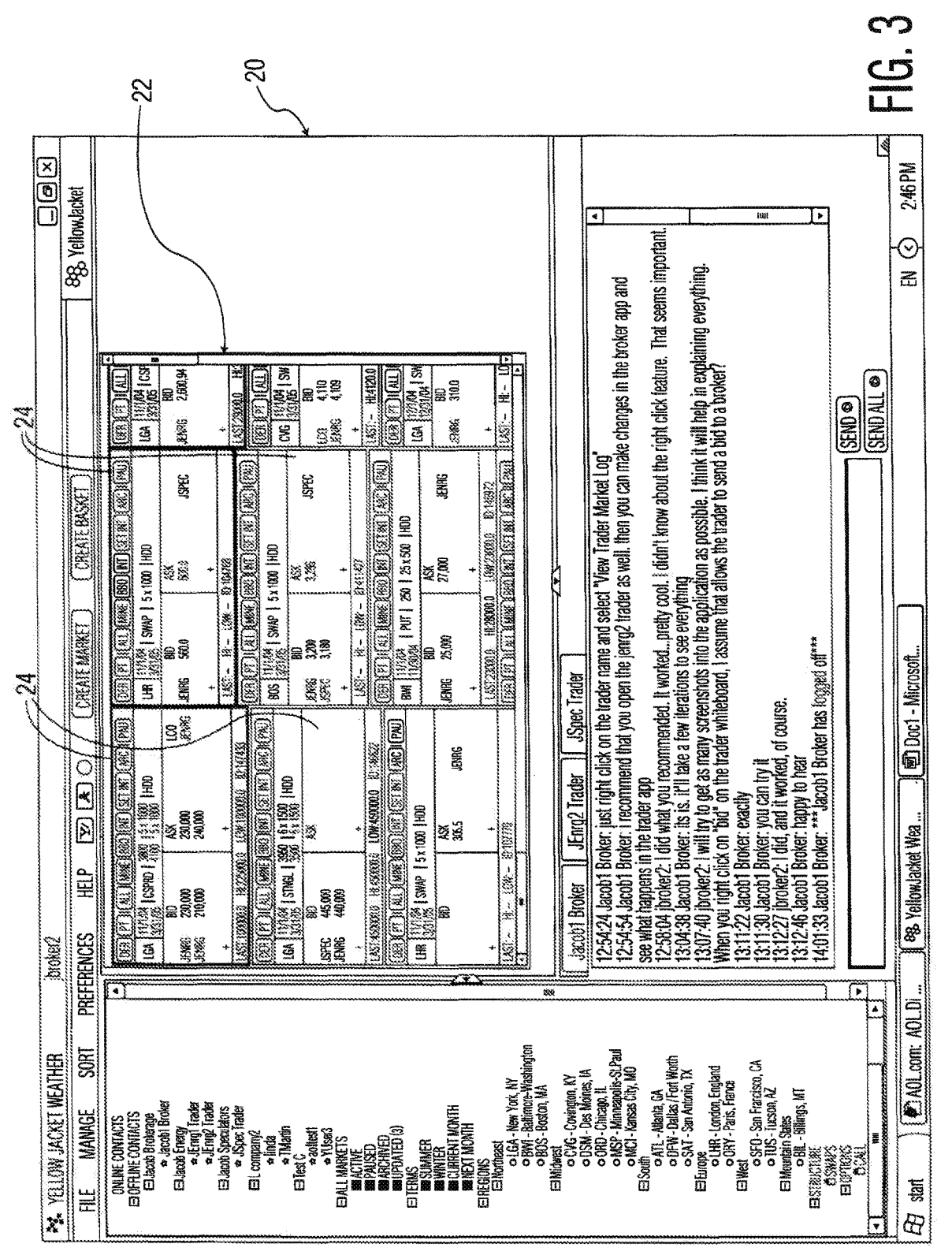

The broker graphical interface 20 retrieves data from and sends data to the broker database 10 and displays information regarding financial products at the broker client computer 15. The broker interface 20 allows brokers to create products, manage trader bids and offers, disseminate market updates and communicate with individuals or groups over secure, logged instant messaging. In one embodiment of the invention, the broker interface 20 may be a graphical interface. For example, FIG. 3 is a screen-shot of a broker graphical interface 20 according to an exemplary embodiment of the present invention. The primary component of the broker graphical interface 20 in this embodiment is a broker whiteboard 22. It should be appreciated that the broker graphical interface 20 is not limited to the whiteboard configuration shown in FIG. 3, and any suitable graphical user interface that allows the broker to perform the functions mentioned above is suitable for use in the present invention. The broker whiteboard 22 includes a number of markets 24, where each market 24 describes and provides data regarding a corresponding product in the broker database 10. In this regard, the broker can input a new product, and hence create a new market 24, using a product creation wizard. The product creation wizard is preferably a rule-based interface that allows brokers to create standard financial products as well as more complex variations of products. Each product created in the broker whiteboard 22 is also automatically entered into the broker database 10.

Figure 4:
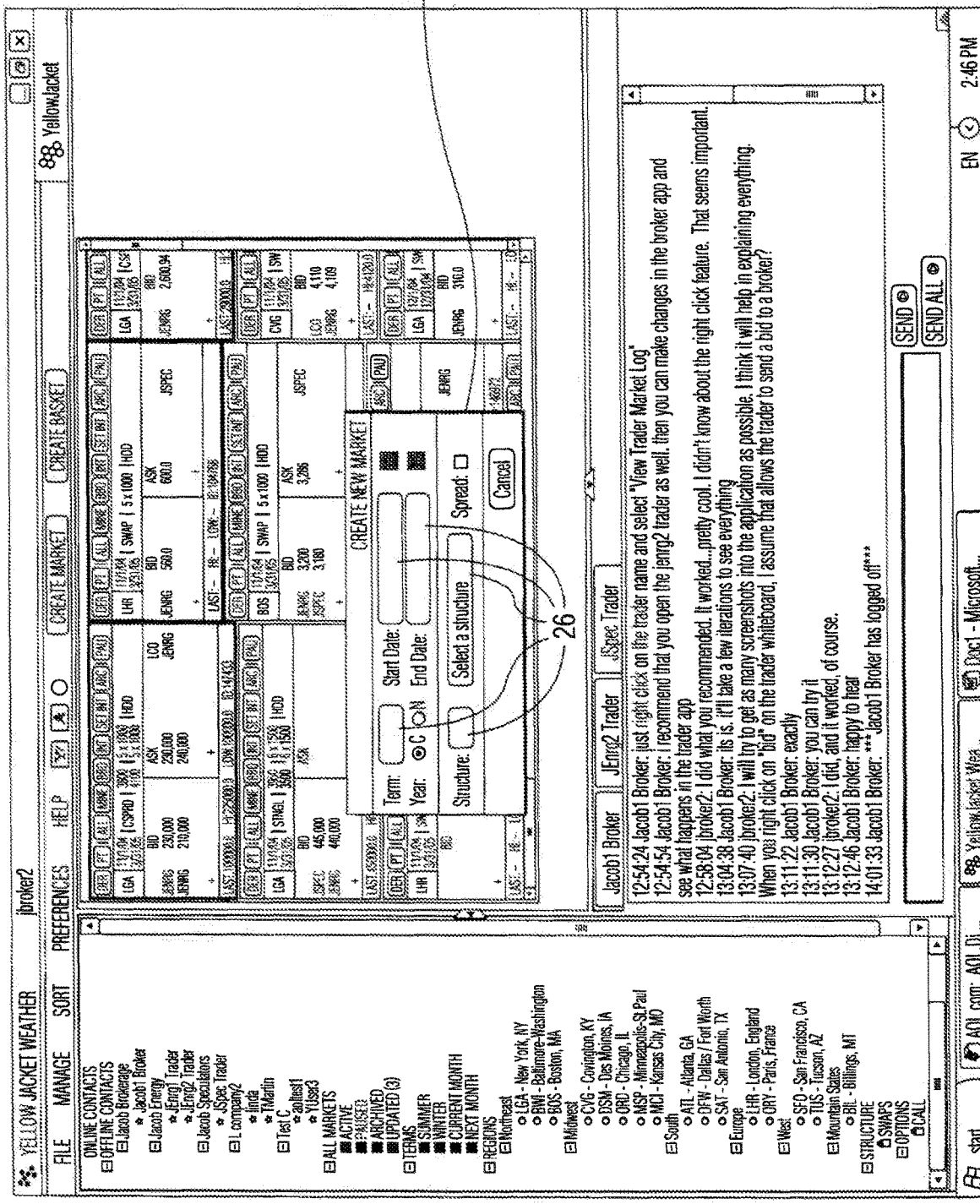
FIG. 4 shows an product creation wizard according to an exemplary embodiment of the invention.
Figure 5:
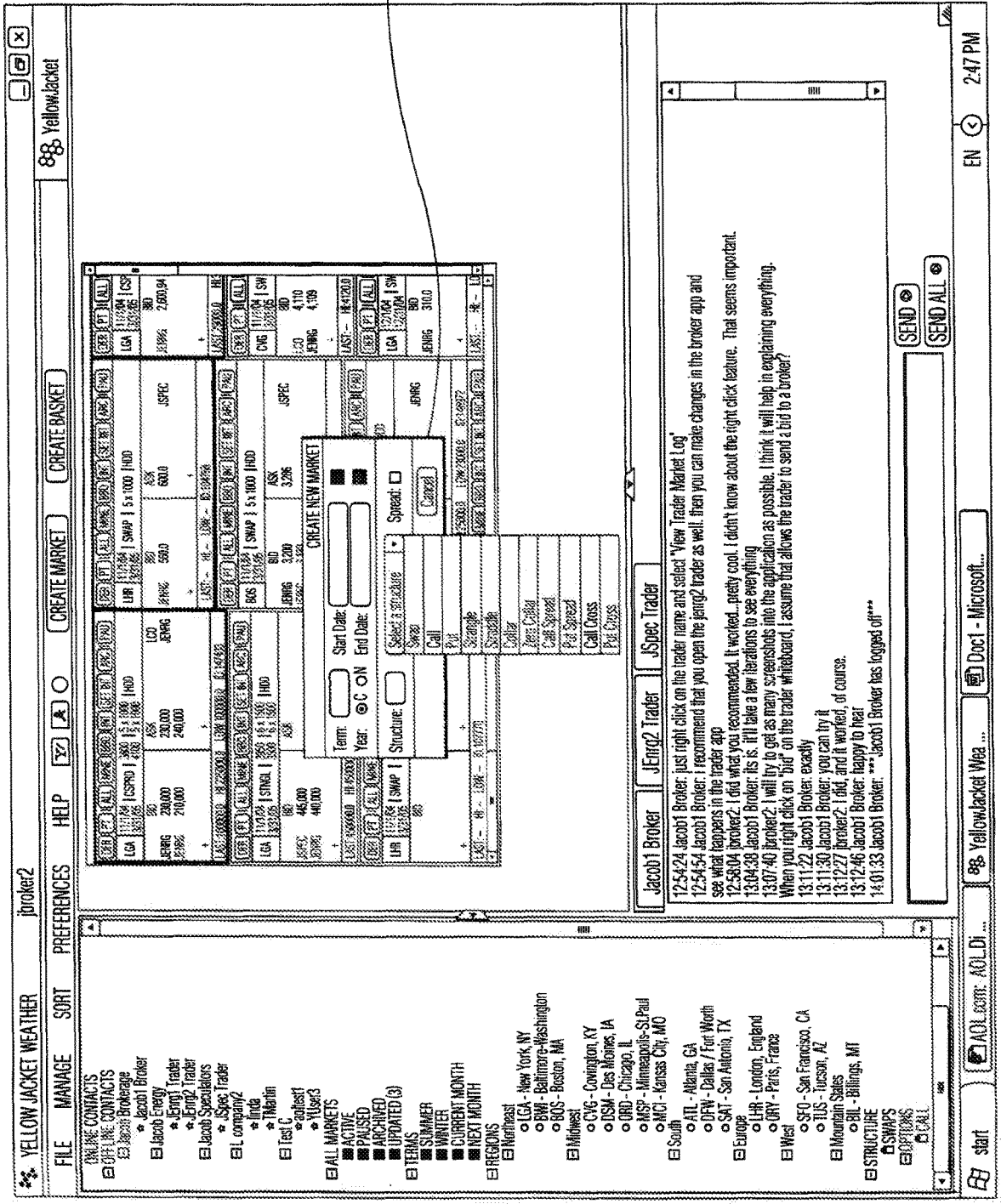
FIG. 5 shows another feature of the product creation wizard of FIG. 4.

FIG. 4 shows a product creation wizard 21 according to an exemplary embodiment of the present invention, which may be accessible by "clicking" on the "Create Market" button in the broker whiteboard 22. The product creation wizard 21 provides a number of input fields 26 in which a broker may input the requested information to define a product. For example, in the case of weather products, the input fields 26 may include "Location(s)", "Time Period", "Structure Type", "Units", "$Tick/Unit" and "Floor/Cap", to name a few. Further, constraints are placed on the inputs based on previous data input by the broker. Thus, in essence, the product creation wizard 21 provides an input interface based on a rule-based decision tree structure. Preferably, the product creation wizard 21 first queries the broker to input some generic information regarding the product. As shown in FIG. 4, this generic information may include the product term, start date, end date, and structure. As shown in FIG. 5, the product structure may be input to a product structure input field using a structure code or may be selected from a pull-down menu. Selecting the structure from the pull-down menu automatically populates the product structure input field with the corresponding product structure code.

Figure 6:
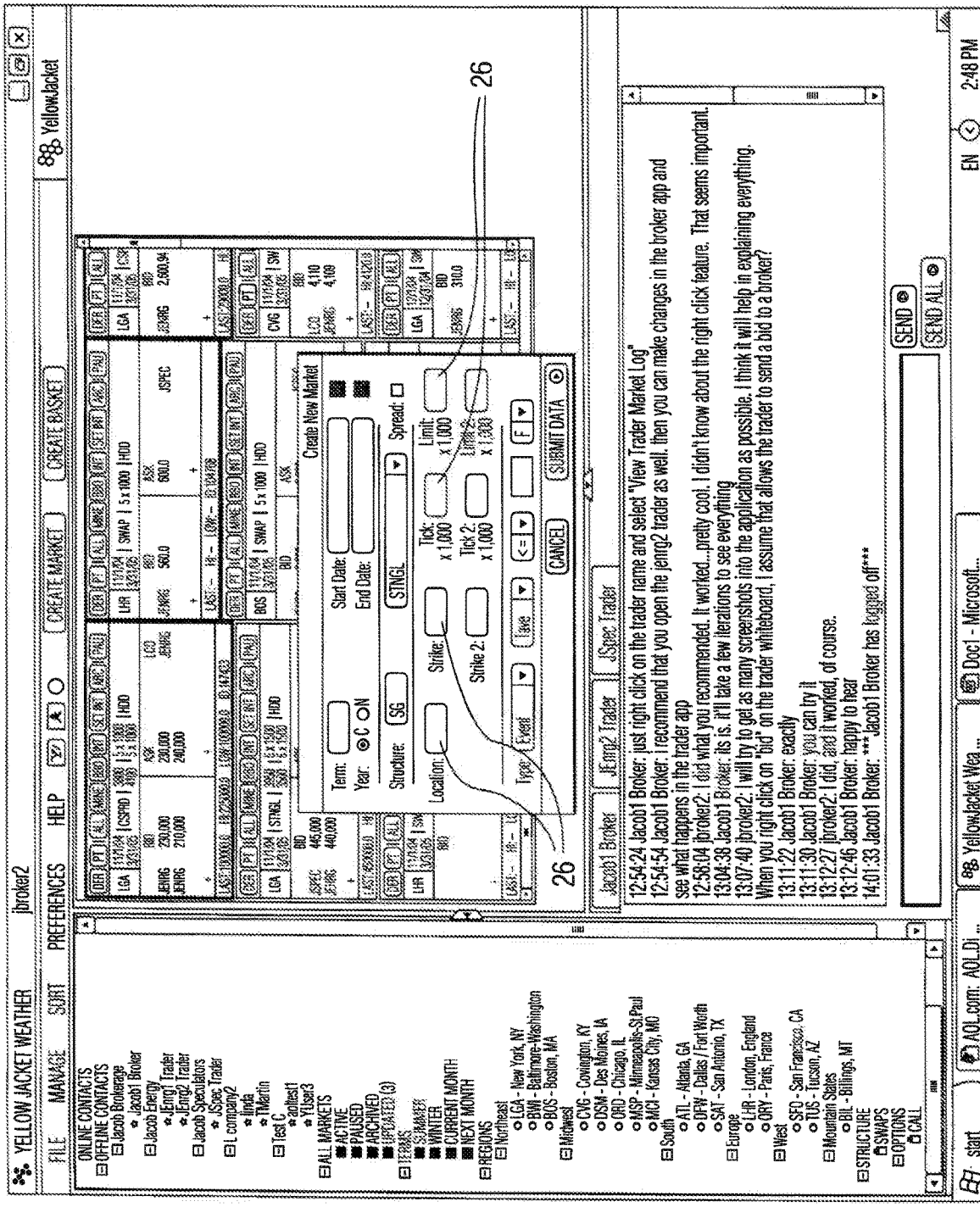
FIG. 6 shows another feature of the product creation wizard of FIG. 4.

As shown in FIG. 6, once the generic information including the product structure is input, the product creation wizard 21 provides additional input fields 26 for input of more specific information relating to the product. Which additional input fields 26 are generated depends on the generic information previously input by the broker, and more particularly, depends on the selected product structure. For example, if the broker indicates that the product is a non-spread product, the product creation wizard 21 will not allow the broker to enter information regarding a second location, because non-spread products are not defined using such information. In this instance, the product creation wizard does not provide a "Location 2" input field.

The rules used by the create product wizard 21 are preferably defined based on XML descriptions of product properties and constraints. The XML descriptions may set rules to limit the type of information that can be used to define a particular product. The XML descriptions are summarized in the Table 28 shown in FIG. 7, which lists some of the possible types of products (e.g., "swap", "spread swap", "zero collar") and indicates which components may be used to define each product. For example, the "swap" type product requires a location ("Location 1"), a "Start Date", an "End Date", an "Index", "Units", a tick ("Tick 1") and a limit ("Limit 1"). Thus, these input fields are available to be filled in by the broker. However, the "swap" type product is not defined by a second location ("Location 2"), a strike ("Strike 1" and "Strike 2"), a second tick ("Tick 2"), or a second limit ("Limit 2"). Thus, these input fields are not available to be filled in by the broker for the swap product.

Figure 8:
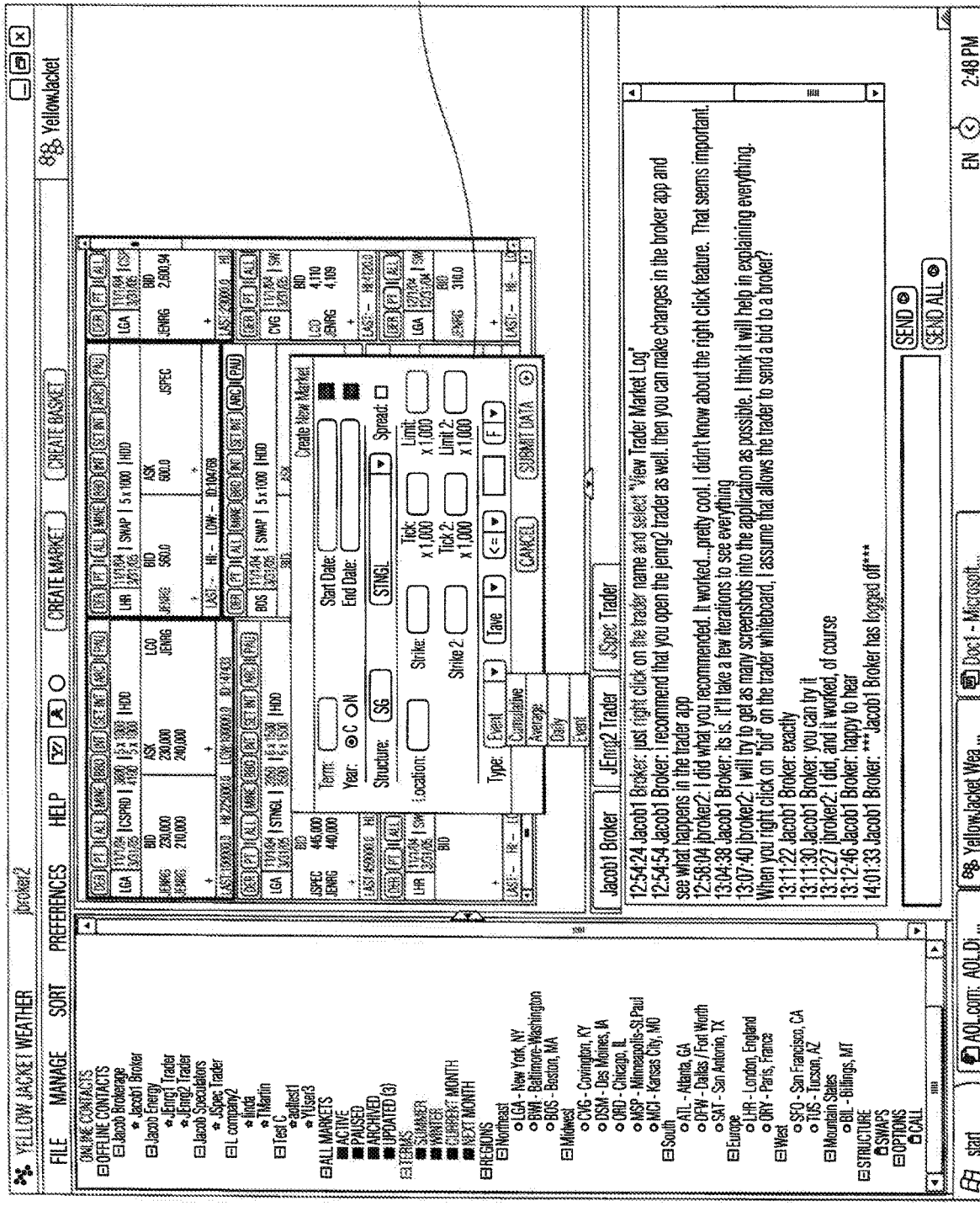
FIG. 8 shows another feature of the product creation wizard of FIG. 4.

In addition, particularly in the case of weather products, every product structure requires an index type, an index variable, and, depending on the index type selected, an index unit, an operator, a reference and a reference value. For example, as shown in FIG. 8, the product creation wizard 21 provides a pull-down menu from which an index type can be selected. In this embodiment, the index type may be "Cumulative", "Average", "Daily" or "Event". Additional specific input fields 26 are then provided depending on which index type is selected. The rules used to determine which input fields become available based on the index type selection are summarized in Table 30, shown in FIG. 9. Table 30 lists the possible index types and, if applicable, corresponding index variables, index unit, operator, reference unit and reference value which become available once the index type is chosen by the broker. As an example, referring to Table 30, if the broker chooses "Event" as the index type, the product creation wizard 21 provides an index variable input field which can be populated by choosing from a pull-down menu offering Tave (average temperature), Tmin (minimum temperature) and Tmax (maximum temperature) as possible selections, an index unit input field which can be populated by choosing from a pull down menu offering F (Fahrenheit) and C (Celsius) as possible selections, an operator input field which can be populated by choosing from a pull-down menu offering <=, <, >= and > as possible selections, and a reference value input field.

Figure 10:
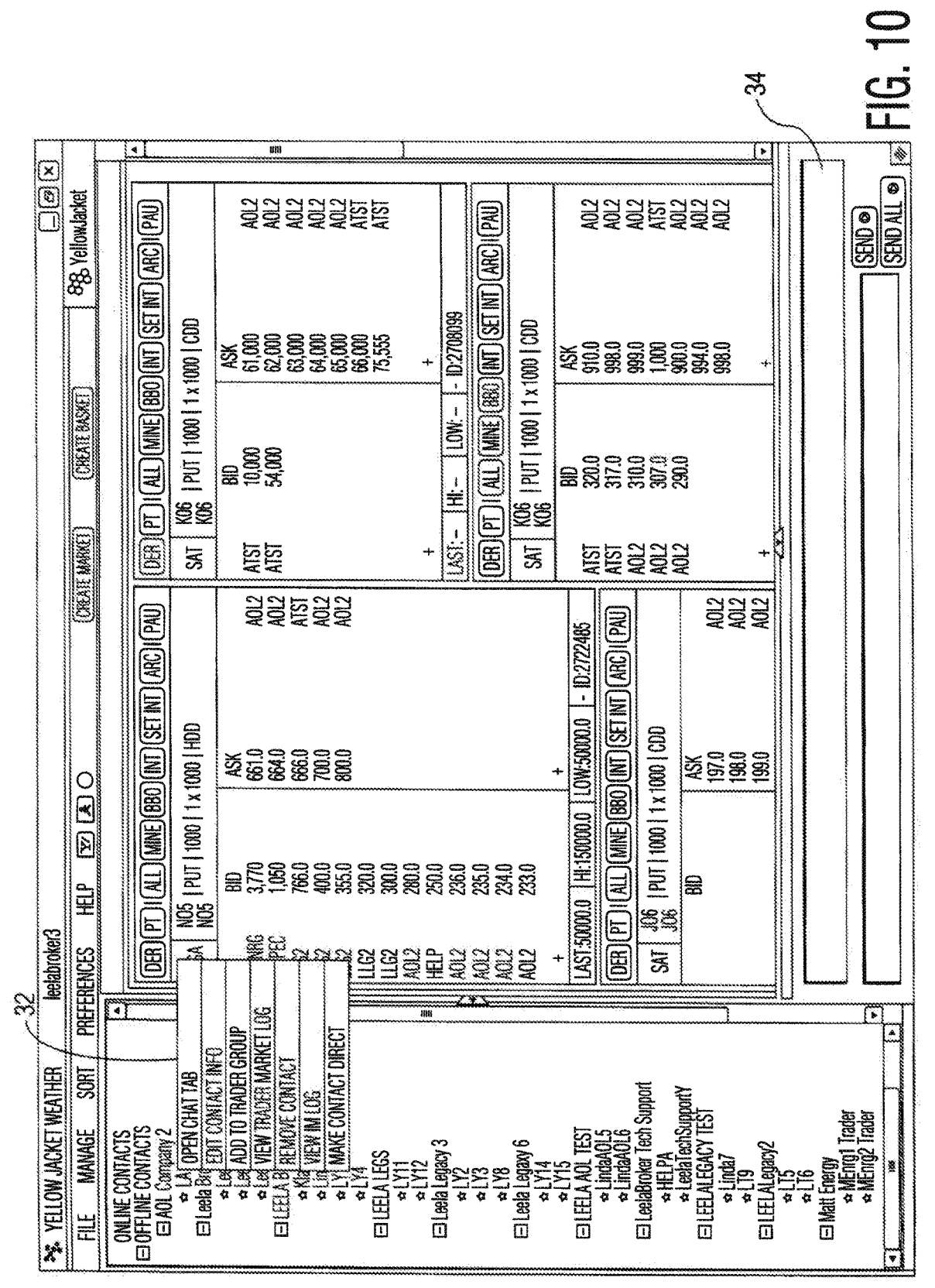
Figure 11:
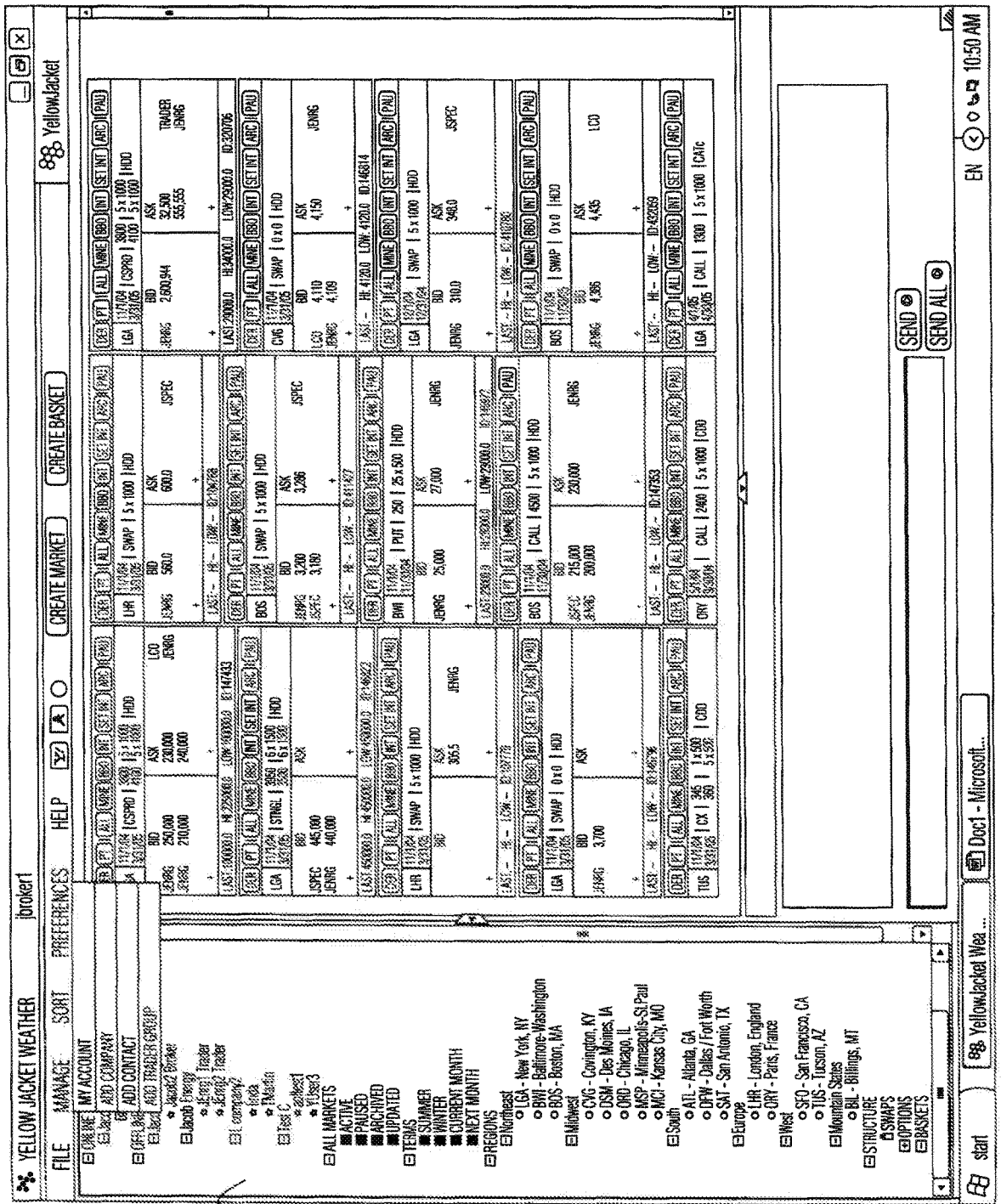
FIG. 11 shows a pull down menu for adding contacts to a contact list in the broker interface according to an exemplary embodiment of the present invention.

The broker whiteboard 22 also provides a navigational bar 32, as shown in FIG. 10. The navigational bar 32 preferably allows a broker to access information regarding or initiate communication with chosen contacts, such as traders and other brokers within the same company. For example, as shown in FIG. 10, "right-clicking" on the broker "Jacob2 Broker" listed in the navigational bar 32 results in the display of a menu item, which allows the broker to communicate with "Jacob2 Broker" and/or access information regarding "Jacob2 Broker". One option in the menu item is to open a chat tab, which allows for the broker to communicate with the contact of interest using the instant messaging screen 34 provided at the bottom portion of the broker whiteboard 22 in this embodiment. Other options may be to edit contact information, remove the contact from the contacts list, and view an instant message log relating to the particular contact. New contacts are added to the contacts list by clicking on the "Manage" button located on the top of the broker graphical interface 20, which then provides a pull down menu for adding contacts to the contact list, as shown in FIG. 11. For example, the pull down menu may allow the broker to add a new contact, company or trader group to the contact list. A new contact may also be added under a particular company by right clicking on a company name in the navigational bar 32. It should be appreciated that navigational panels used for market filtering may take other forms in the present invention. For example, buttons may be provided extending horizontally across the broker whiteboard 22 that allow users to limit the markets shown.

The navigational bar 32 also allows the broker to choose which markets to display in the broker whiteboard 22. By selecting a particular contact, only those markets in which the selected contact is involved are displayed in the broker whiteboard 22. The broker may choose which markets to display based on additional factors, such as, for example, whether the markets are active, paused, archived or updated, in which terms the markets are active (summer, winter, current month, next month), to which regions the markets are related (northeast, midwest, south, Europe, west, mountain states), or the structure of the markets (swap, options, baskets). The options listed in the navigational bar 32 shown in the figures are merely exemplary, and any other options may be provided to allow the broker to choose which markets to display in the broker whiteboard 22.

Figure 12:
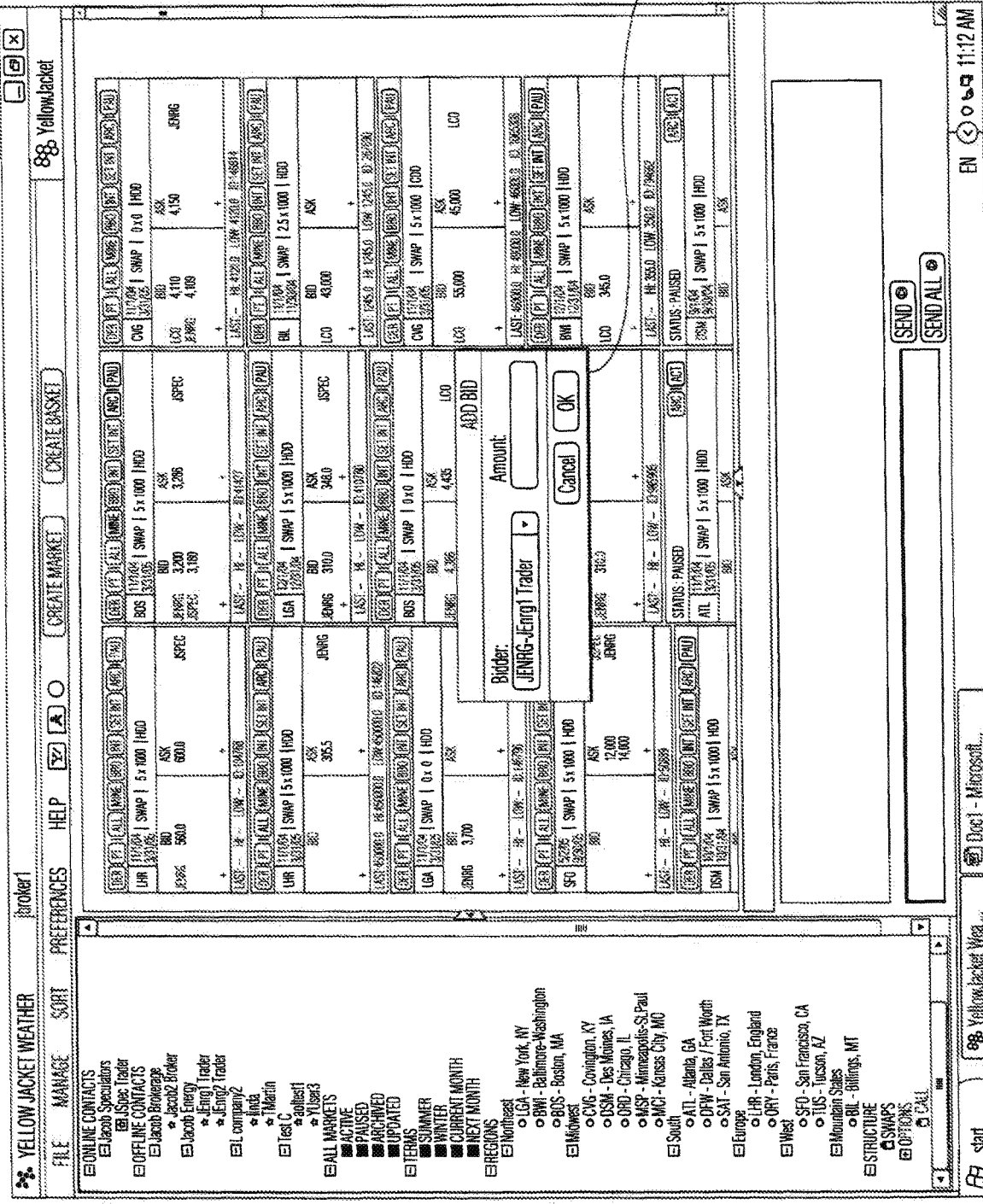
FIG. 12 shows an add bid interface provided in a broker interface according to an exemplary embodiment of the present invention.
Figure 13:
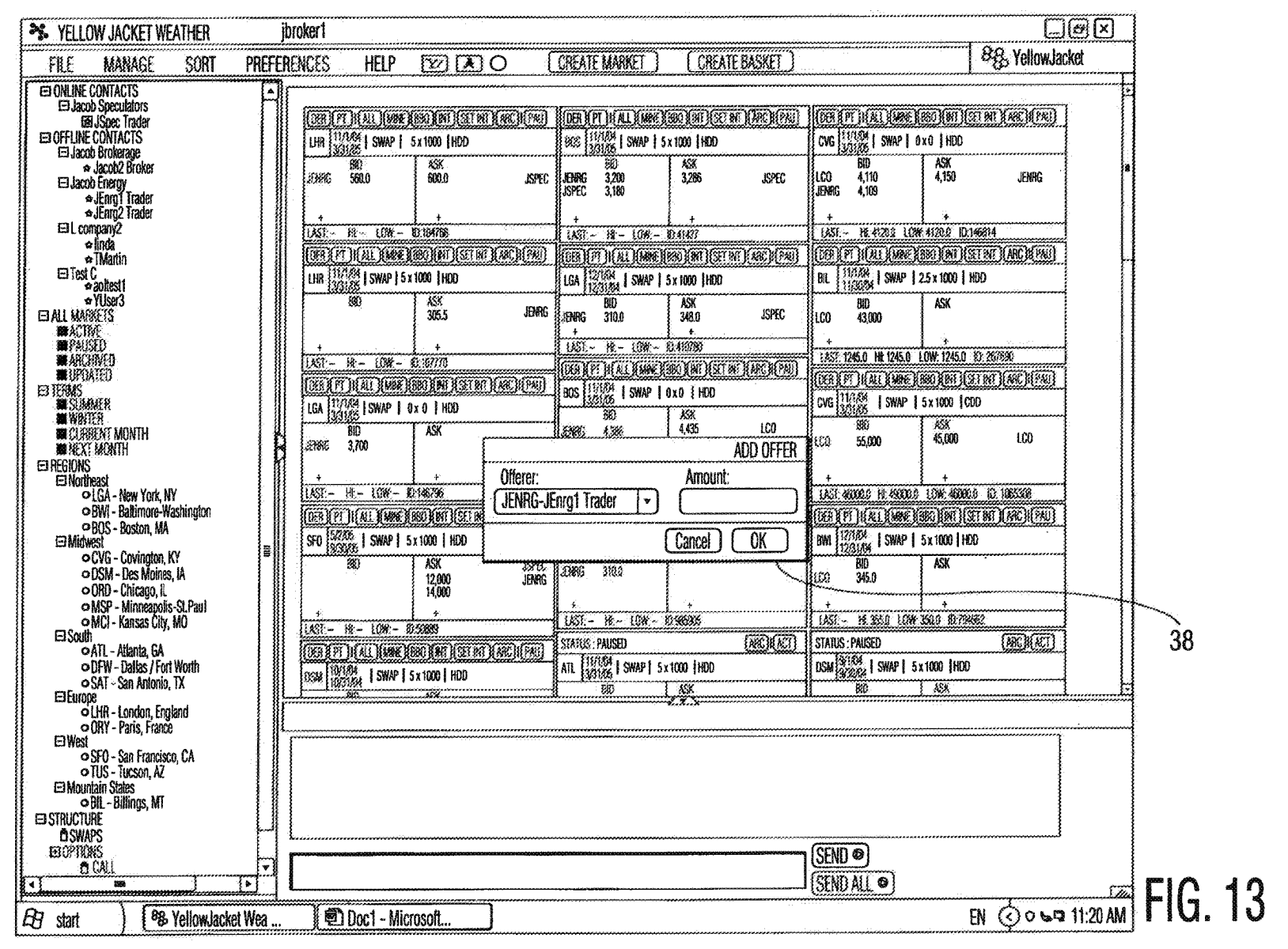

Brokers can add a new bid or offer to each market by clicking on the "+" symbol located at the bottom portion of each market in the broker whiteboard 22. The use of a "+" symbol is merely exemplary, and any other suitable button or input field may be provided to allow a broker to enter a new bid or ask. In this embodiment, as shown in FIG. 12, clicking on the "+" symbol in the bid column of a market results in the display of an add bid interface 36. The add bid interface 36 provides a pull down menu of known traders from which the broker may choose to indicate which trader is making the bid, and an input field for the broker to input the bid amount. Similarly, clicking on the "+" symbol in the offer column of a market results in the display of an add offer interface 38, as shown in FIG. 13. The add offer interface 36 provides a pull down menu of known traders from which the broker may choose to indicate which trader is making the offer, and an input field for the broker to input the offer amount.

Figure 14:
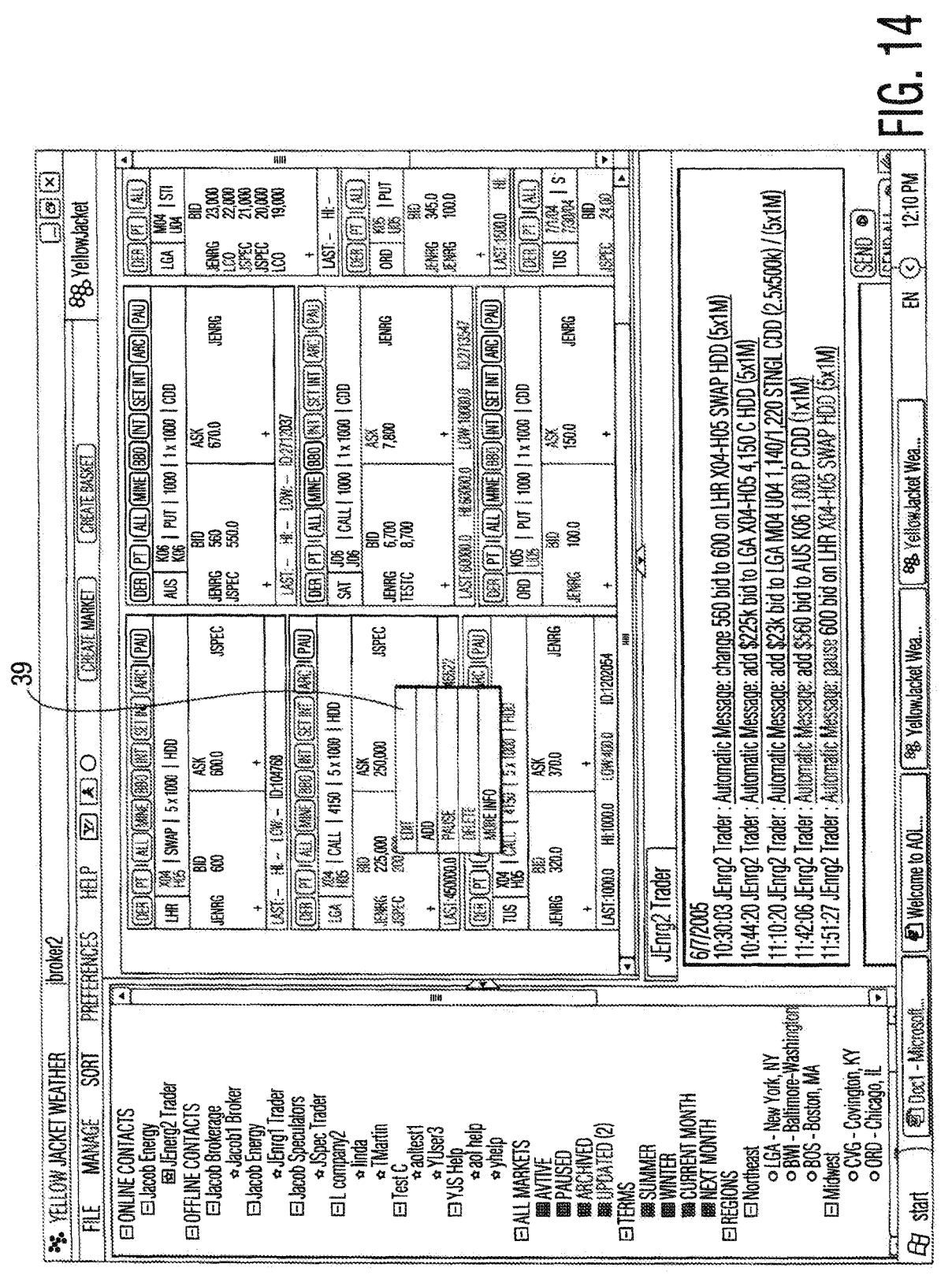

A broker may also alter individual bids and offers within each market. For example, a broker may select a particular bid or offer, such as by right-clicking on the bid or offer, which results in the display of a broker bid/offer edit menu 39, as shown in FIG. 14. By selecting the appropriate button in the broker bid/offer edit menu 39, the broker can edit, add, pause or delete a particular bid or offer.

The virtual exchange system 1 also allows a broker to derive new markets based on existing markets. In particular, clicking on the "DER" button located at the top portion of a selected market 24 results in the display of the product creation wizard 21, with the generic information and more specific information regarding a new market pre-filled based on the selected market 24. The broker is then able to modify the existing information to thereby create a new market, without having to enter all of the necessary information.

Figure 15:
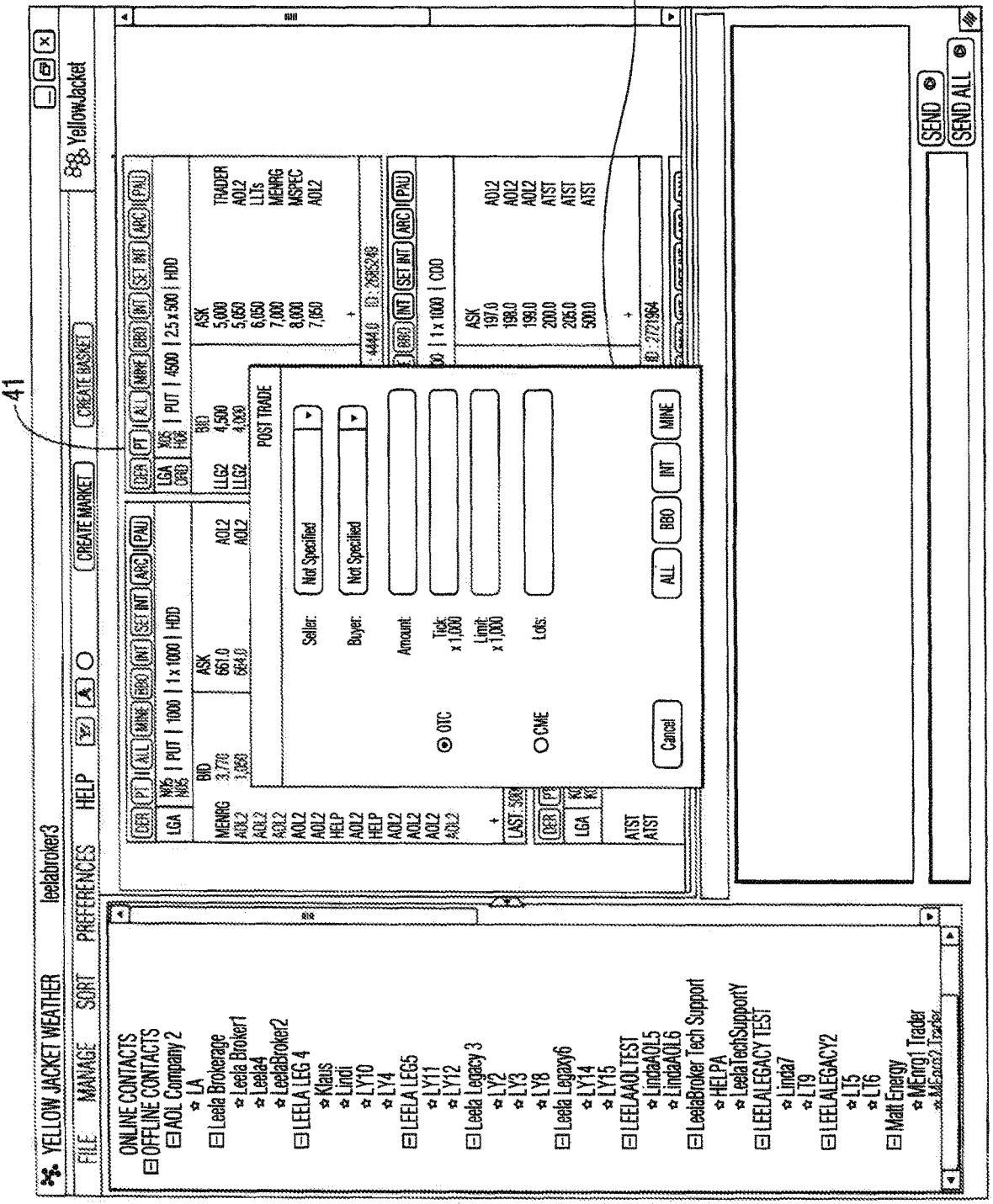
FIG. 15 shows a trade entry interface provided in a broker interface according to an exemplary embodiment of the present invention.

A broker may also post a trade in each market 24 by clicking on a "post trade" button 41 located in each market. Selecting the "post trade" button 41 results in the display of a trade entry interface 43, as shown in FIG. 15. The trade entry interface 43 allows a broker to enter information regarding a trade, such as, for example, the seller of the product, the buyer of the product, the amount of the trade, the tick and the limit, and the clearing mechanism, if any, for the contract.

Figure 16:
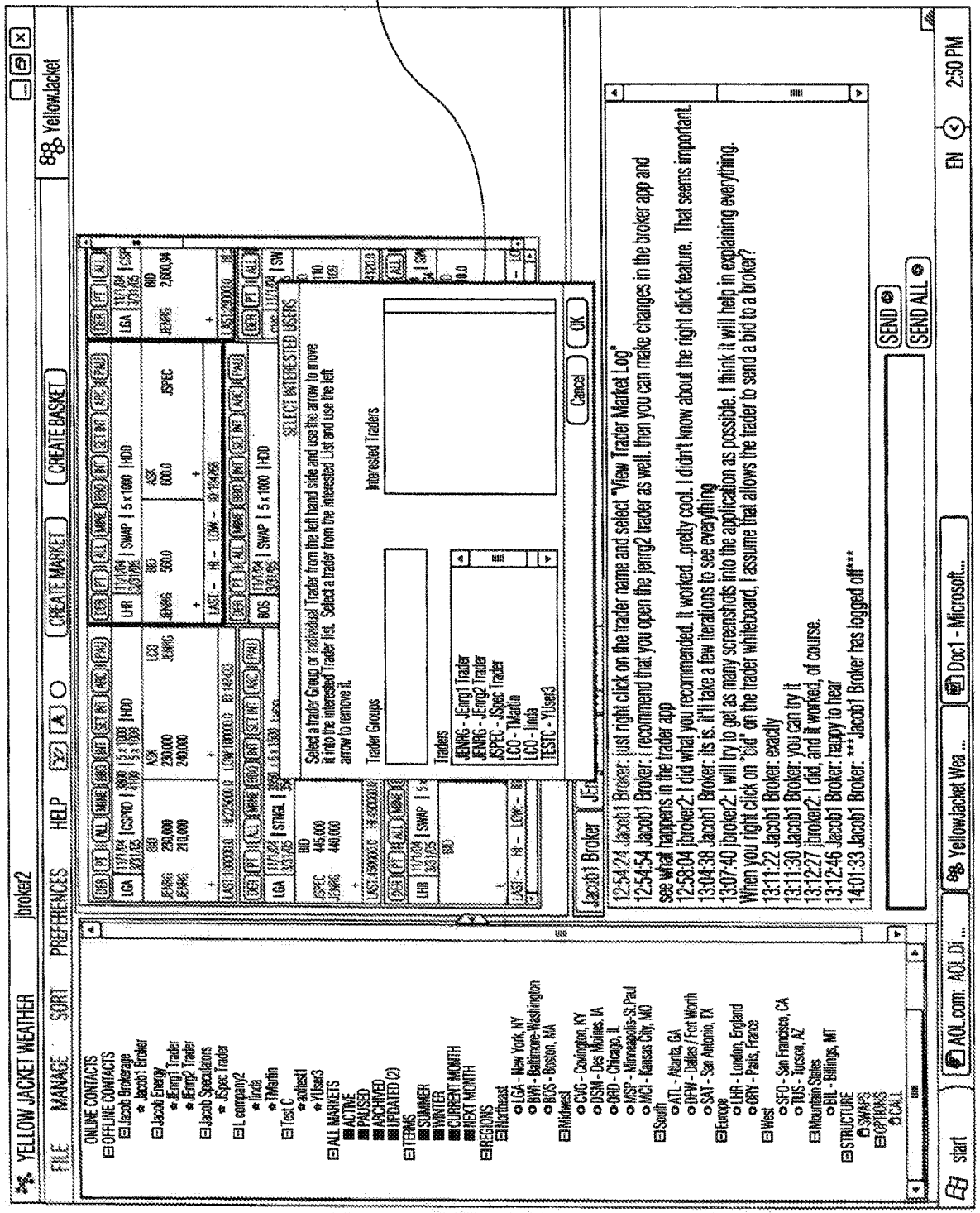
FIG. 16 shows an interested users input interface provided in a broker interface according to an exemplary embodiment of the present invention.

A broker can choose to which contacts market updates are sent by selecting from one of the "ALL", "MINE", "BBO" and "INT" buttons located at the top portion of each market 24. Clicking the "MINE" button sends market updates to the list of direct, or personal, contacts in the broker's contact list located in the navigational bar 32, clicking the "BBO" button sends market updates to only the traders having the best bid and offer, and clicking the "INT" button sends market updates to only interested traders and/or trader groups. As an example, the "MINE" button may be used by a broker to send market updates to the broker's direct contacts, such as the broker's personal clients. The list of interested traders and/or trader groups is set up for each market 24 by clicking on the "SET INT" button disposed adjacent to the "INT" button at the top portion of each market. As shown in FIG. 16, clicking on the "SET INT" button results in the display of an interested users input interface 40, which allows the broker to select from a pre-populated list of traders and trader groups to add to a list of interested traders. Finally, clicking on the "ALL" button results in market updates being sent to all of the traders, which comprise all the clients of the broker's firm, including the broker's direct and indirect clients. The "ALL", "MINE", "BBO" and "INT" buttons may also be made available in the trade input interface 43, thereby allowing the broker to send information regarding a completed trade to other parties. In a preferred embodiment of the invention, multiple brokers within a brokerage firm share the same view of a broker whiteboard 22 on respective broker client computers 15. Thus, an update made to the broker whiteboard is immediately seen by other brokers in the firm. A market that has been updated by a broker may be highlighted a certain color within that brokers view of the broker whiteboard 22, while markets that have been updated by other brokers within the same firm may be highlighted a different color.

Figure 17:
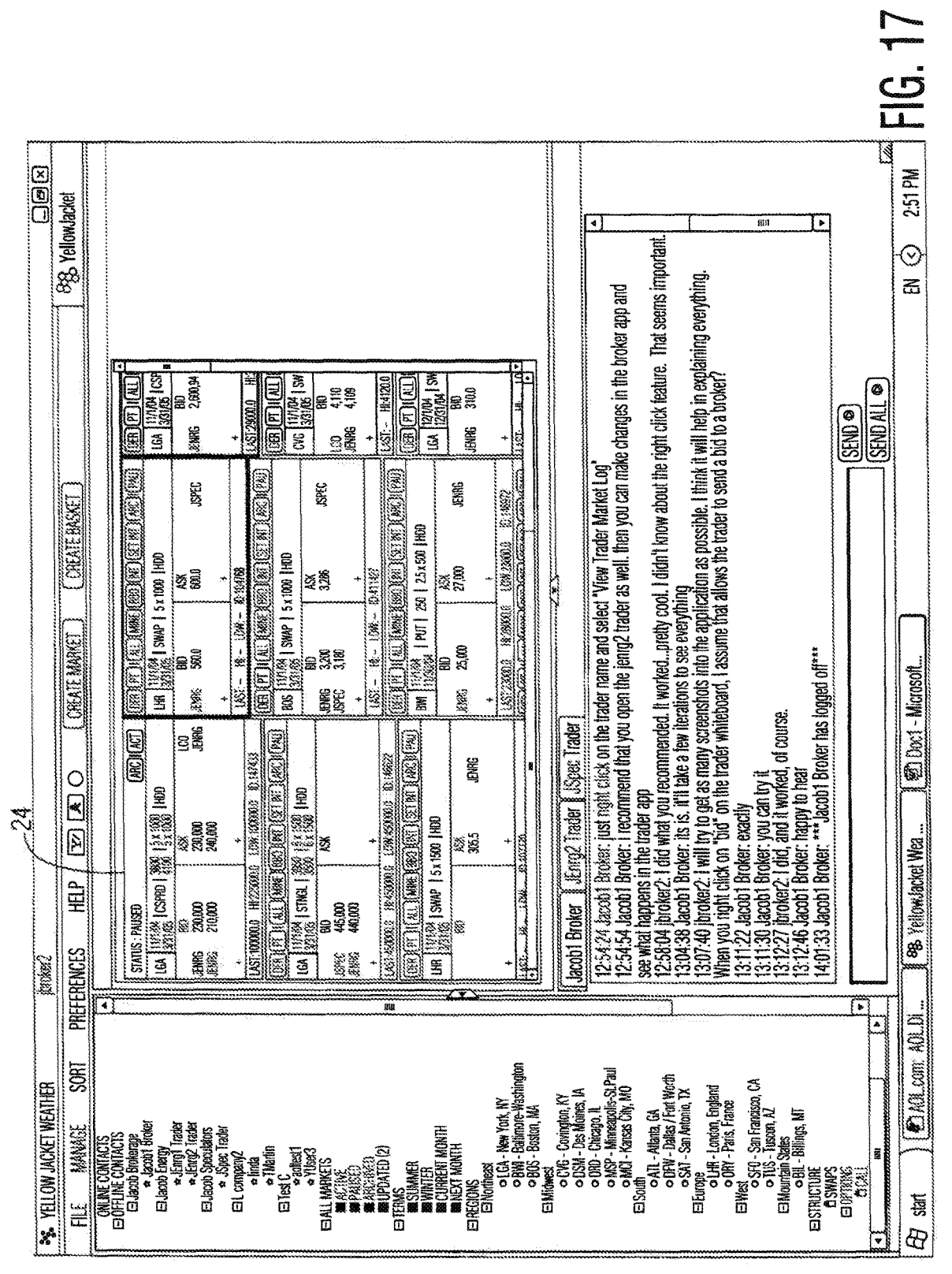

A broker may archive a particular market 24 by clicking on the "ARC" button disposed at the top portion of the market 24. This action results in the continued display of the market 24 but does not allow for reinstatement of the market 24. In contrast, a broker may pause a market 24 by clicking on the "PAU" button disposed at the top portion of the market 24. This allows the broker to pause all trading in a particular market 24, and then later re-activate the market by clicking on the "ACT" button, as shown in FIG. 17. In an exemplary embodiment of the invention, the broker may also have the ability to pause all markets in the broker whiteboard 22.

Figure 18:
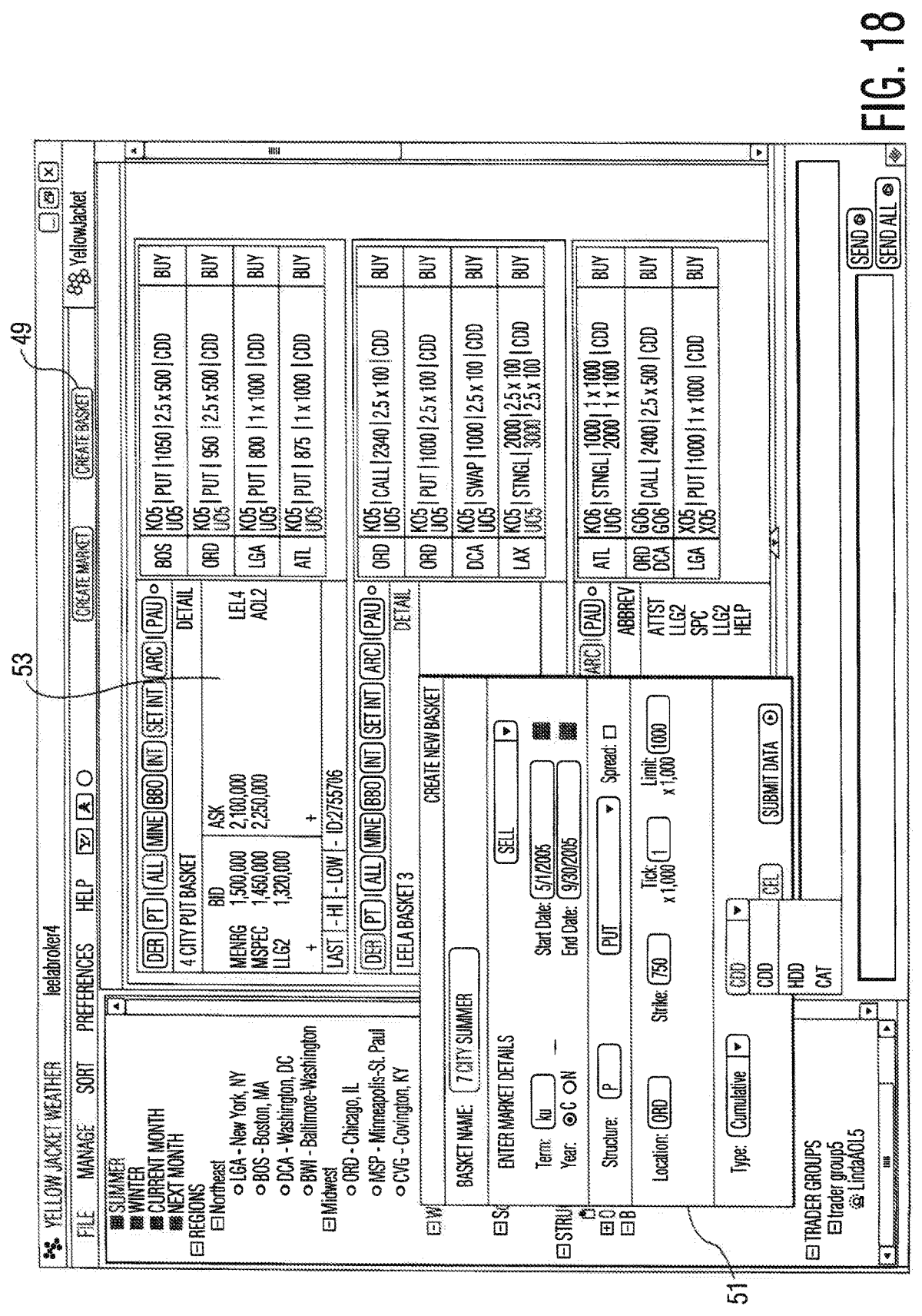

A broker may also combine a group of markets into a basket, which is a collection of market products, and send the information regarding the grouped markets to other parties using a basket string. In particular, the broker graphical interface 20 provides a "create basket" button 49, selection of which results in the display of a basket creation interface 51, as shown in FIG. 18. The basket creation interface 51 allows a broker to enter information regarding a basket and particular markets within a basket. For example, information such as basket name, and information similar to that input to the create product wizard 21 for each market may be input to the basket creation interface 51 to create a basket string, which can be sent to other parties via instant messaging or e-mail. Each basket string preferably includes the designated basket name, the market string for each market structure within the basket, an indication for each structure within the basket as to whether it is to be purchased or sold and what the individual tick and limits and start and end dates are. The following are examples of basket strings as generated by the basket creation interface 51:

BASKET 1 (all 1x5M): (B)LGA xh 1000 P, (S)LGA k 650C w/560 cross, (B)ORD/DCA h 4000 C 300k@500k BASKET 2 (all ku & 1x5M): LGA 650C w/560 cross, ORD/DCA 4000 C, LGA 1000 P 300k@500k As shown in FIG. 18, within a basket view of the broker whiteboard 22, multiple basket markets 53 are displayed. Also, within each basket market 53 are displayed the financial products that are included in the basket, including each financial product's market structure, and the bids and offers made in the basket market 53.

Figure 19:
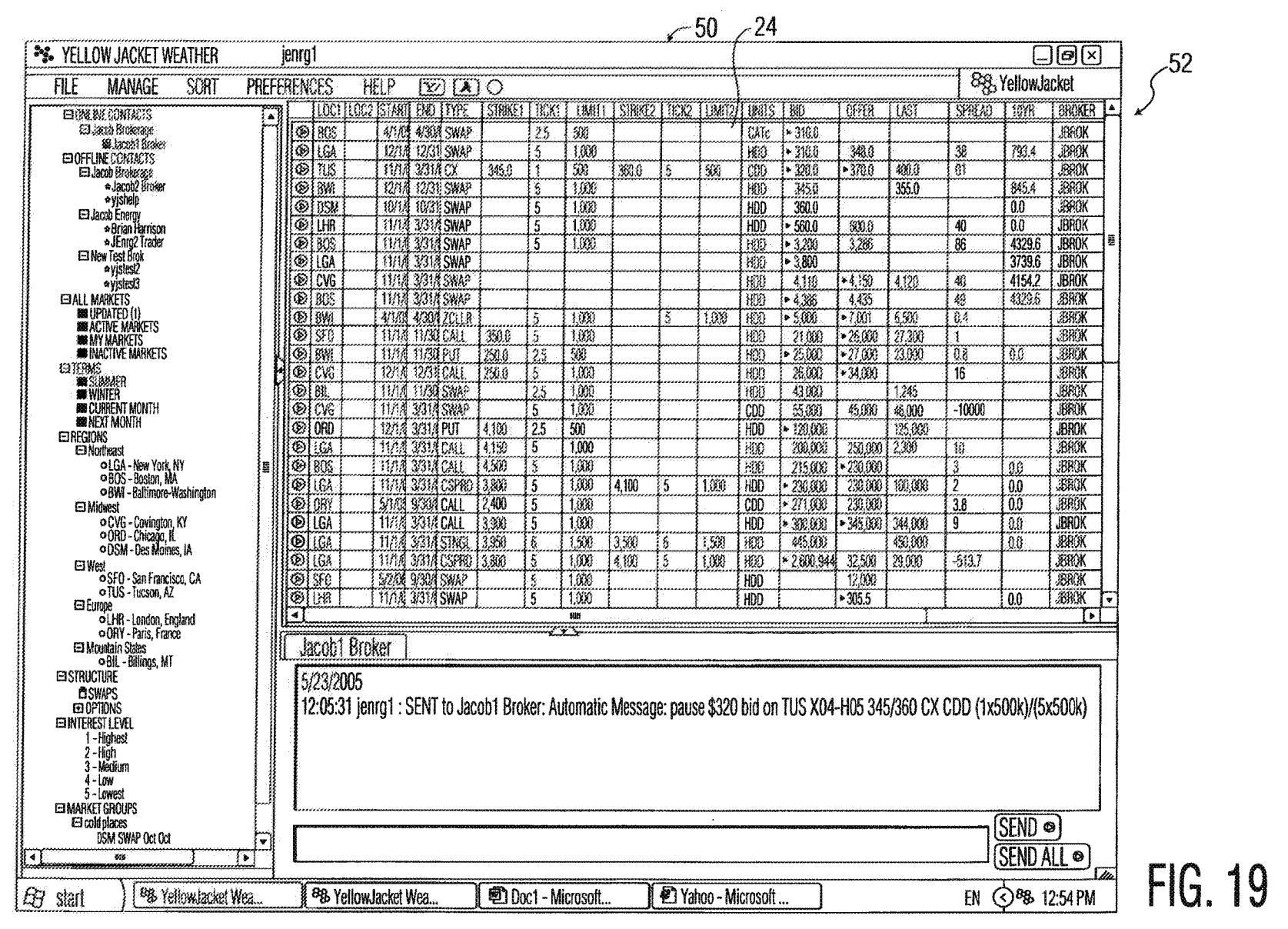

The virtual exchange system 1 also includes a trader graphical interface 50, as shown in FIG. 19, which is displayed at the trader client computer 17. The trader graphical interface 50 provides a spreadsheet-like display of those markets 24 to which a broker or brokers have provided access. For example, if Broker A creates a new market 24 and chooses to send the new market information to only interested traders, and Broker A did not set Trader A as a member of the interested traders group, then Trader A will not receive the new market information. Thus, a trader will not receive every market from every broker, but will instead only receive select markets from those brokers who have chosen the trader to receive the select markets. The trader graphical interface 50 displays information that is stored in the trader database 45. The trader database 45 references the information in the broker database 10 regarding the product parameters, the best bids and offers and the trader's own bids and offers. Alternatively, the trader database 45 may contain a copy of the information stored in the broker database 10. The bid and/or offer in a market may be modified by the broker before sending the market information to a particular trader, so that not all traders receive the same bid and offer information for the market.

Figure 20:
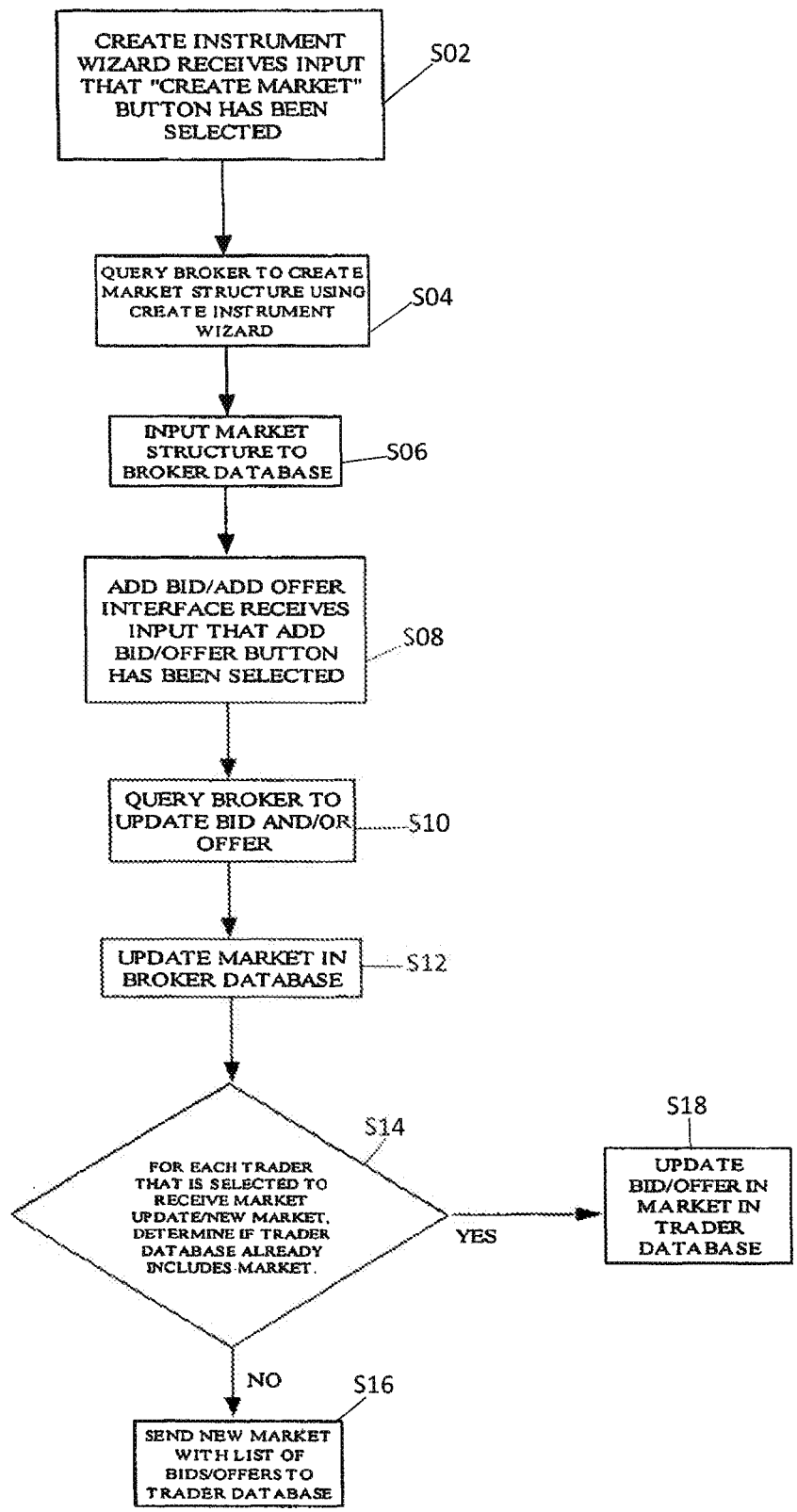
FIG. 20 shows a flow chart illustrating a method of creating a new market and sending market information to a trader according to an exemplary embodiment of the present invention.

FIG. 20 shows a flow chart illustrating a method of creating a new market and sending market information to a trader according to an exemplary embodiment of the invention. In step S02 of the method, the create product wizard 21 receives an input that the "Create Market" button has been selected, indicating that the broker wishes to create a new market. In S04, the create product wizard 21 queries the broker to input a market structure. In step S06, the newly created market structure is assigned a unique market structure identification number and stored in the broker database 10. In step S08, either the add bid interface 36 or the add offer interface 38 receives an input that one of the add bid button or the add offer button has been selected, indicating that the broker wishes to add a new bid or offer to the market. In step S10, the add bid interface 36 or the add offer interface 38 queries the broker to input a new bid or offer. In step S12, the market in the broker database 10 is updated with the new bid or offer information. It should be appreciated that, in this step, the previously defined market structure is not altered, and only the bid and offer information is input to update the market. In step S14, for each trader that is selected to receive the market update/new market, it is determined whether the virtual trader database 40 already includes the market structure information as identified by the previously mentioned unique market structure identification number. If the trader does not already have information on the market structure, the market structure is sent to the trader by referencing the market structure information in the broker database 10 along with the updated bid or offer information and a list of current bids and offers in the market. If the trader has the market structure information, only the bid or offer information is updated in the virtual trader database 40.

Figure 21:
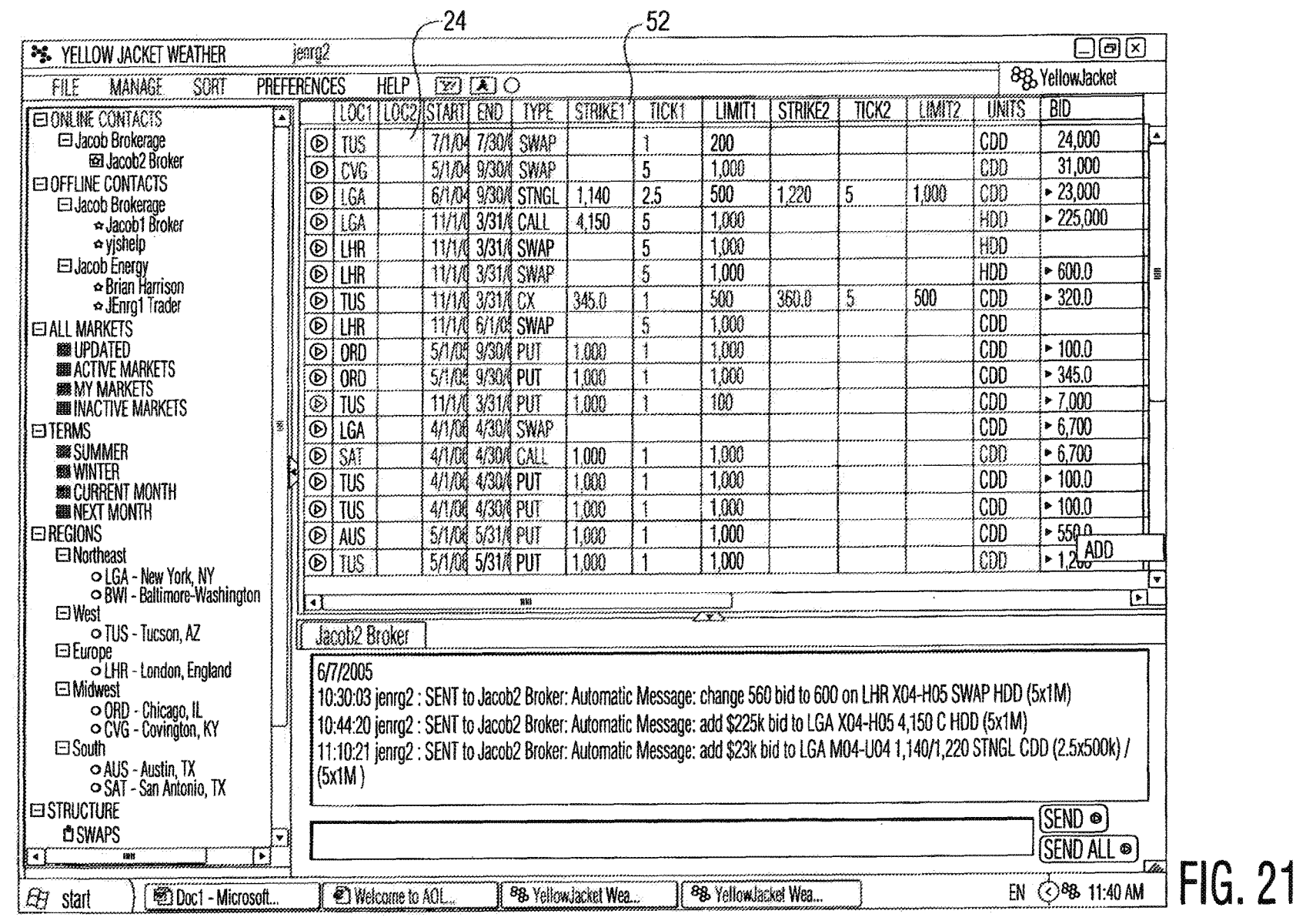
Figure 22:
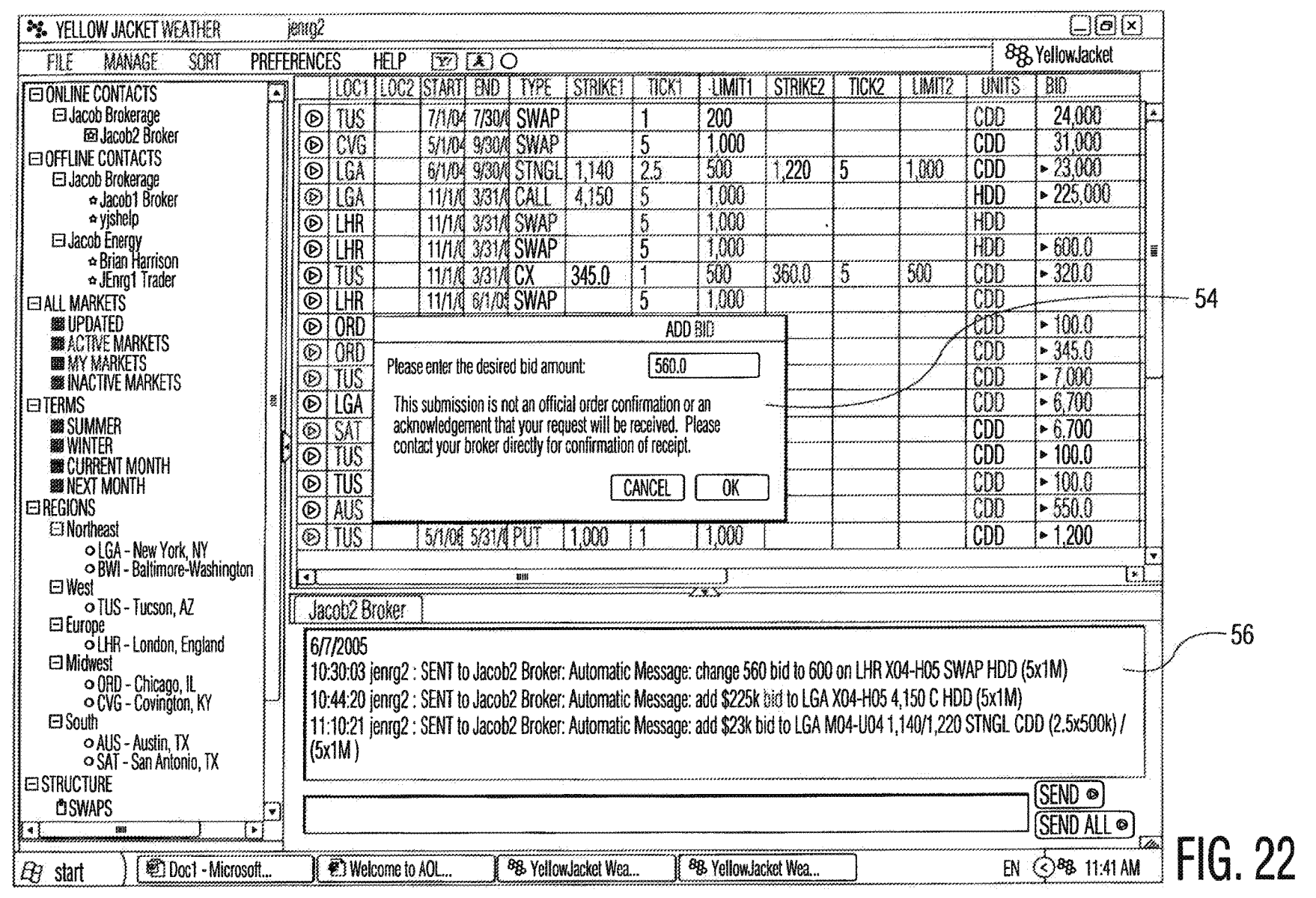

As shown in FIG. 19, the trader graphical interface 50 includes a trader whiteboard 52 which provides, for each market 24, the market structure (LOC1, LOC2, START, END, TYPE, STRIKE1, TICK1, LIMIT1, STRIKE2, TICK2, LIMIT2, UNITS), as well as the latest bid (BID) and ask (OFFER), the last trade value (LAST), the spread between the latest bid and ask (SPREAD), the 10-year daily average (10YR) of CDDs or HDDs, the broker handling the trade (BROKER), the trade ID number (ID) and the interest level (INTEREST). A trader can request a broker to add a bid or offer to a market 24 in the trader whiteboard 52 by selecting the bid or offer, such as by "right clicking" the bid or offer, which results in the display of an "ADD" button, as shown in FIG. 21. Selecting the "ADD" button results in the display of an add bid input interface 54, as shown in FIG. 22. Alternatively, an add offer input interface would be displayed if the trader chose to request an offer update. The add bid input interface 54 provides an input field for a bid amount. Once the trader inputs a bid amount, a message is automatically sent to the instant messaging screen 34 in the whiteboard of the broker handling the market 24 requesting the broker to add the bid amount to the market 24. An indication that such a message has been sent is also displayed in the instant messaging screen 56 of the trader graphical interface 50. In this example, the trader has chosen to enter a bid amount of $560, and thus an automatic message in the form of a text description, or text string, of market details is sent to the broker handling the market. Preferably, the message sent to the broker is in the following format: "add bid to (text description)".

Once the broker receives the automatic message from the trader requesting an add of a bid or offer, the broker can add the bid or offer to the market using the add bid interface 36 or the add offer interface 38, as previously described. Once the bid or offer is added to the market, the broker can choose to send the updated market information back to the trader to show that the add has been completed, using the "ALL", "MINE", "BBO" or "INT" buttons, as previously described.

Figure 23:
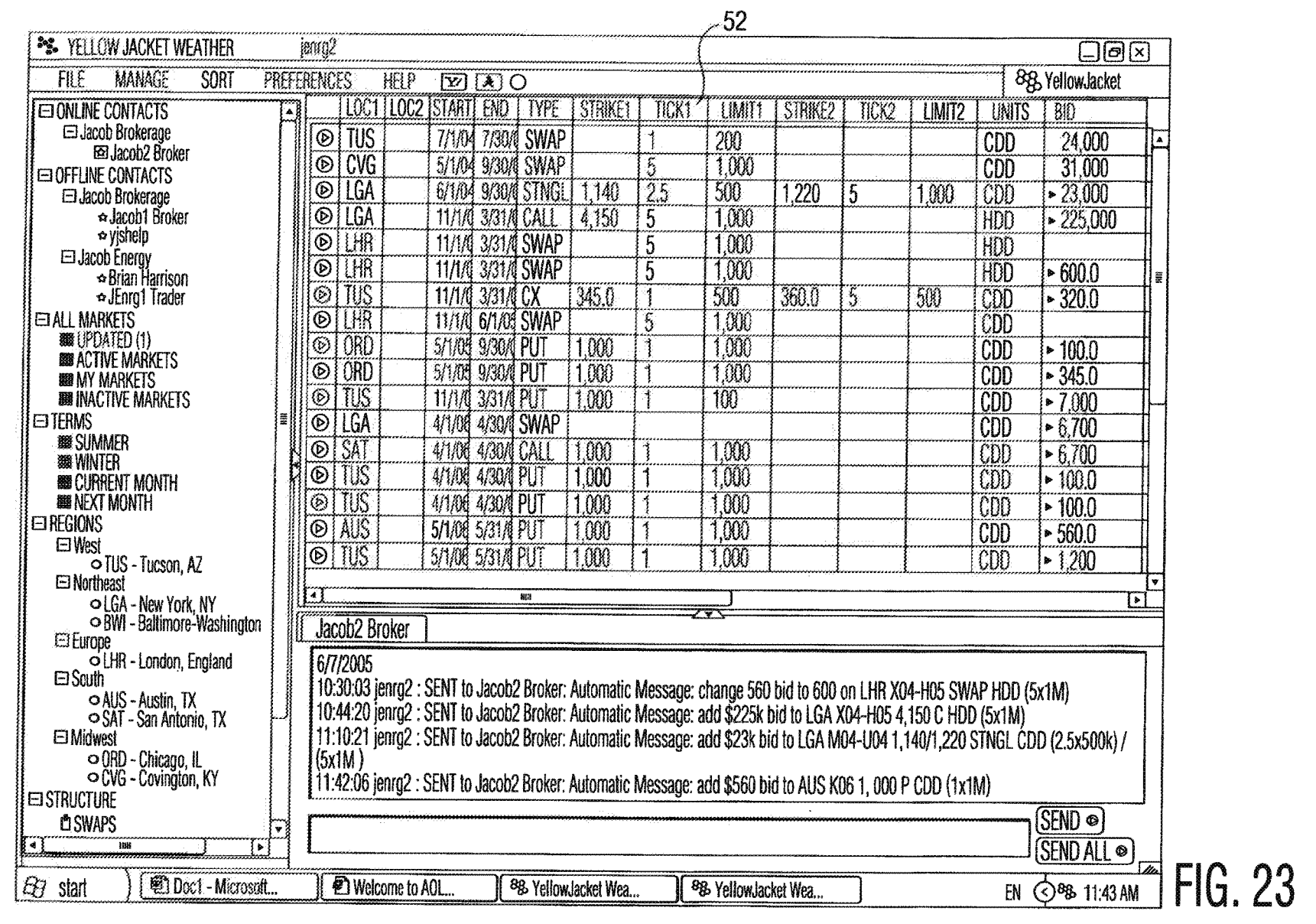

The update market information is then displayed on the trader whiteboard 52, along with indications that the market has been updated and the trader's submitted bid or offer will display in the market. For example, in this example, as shown in FIG. 23, the updated market is shown highlighted to indicate a recent update, and a triangular symbol is displayed next to the added bid of $560 to indicate that it is the trader's bid. In this regard, the markets in which the trader is currently participating in may also be indicated in the trader whiteboard 52. For example, as shown in FIG. 23, if a triangular symbol is highlighted in the first column of a market, then the trader presently has an indication of interest (bid/offer) in the market. It should be appreciated that these indications are merely exemplary, and any other combination of symbols, highlighting and/or other indication methods may be used to inform the trader of recent changes to a market or market participation.

Figure 24:
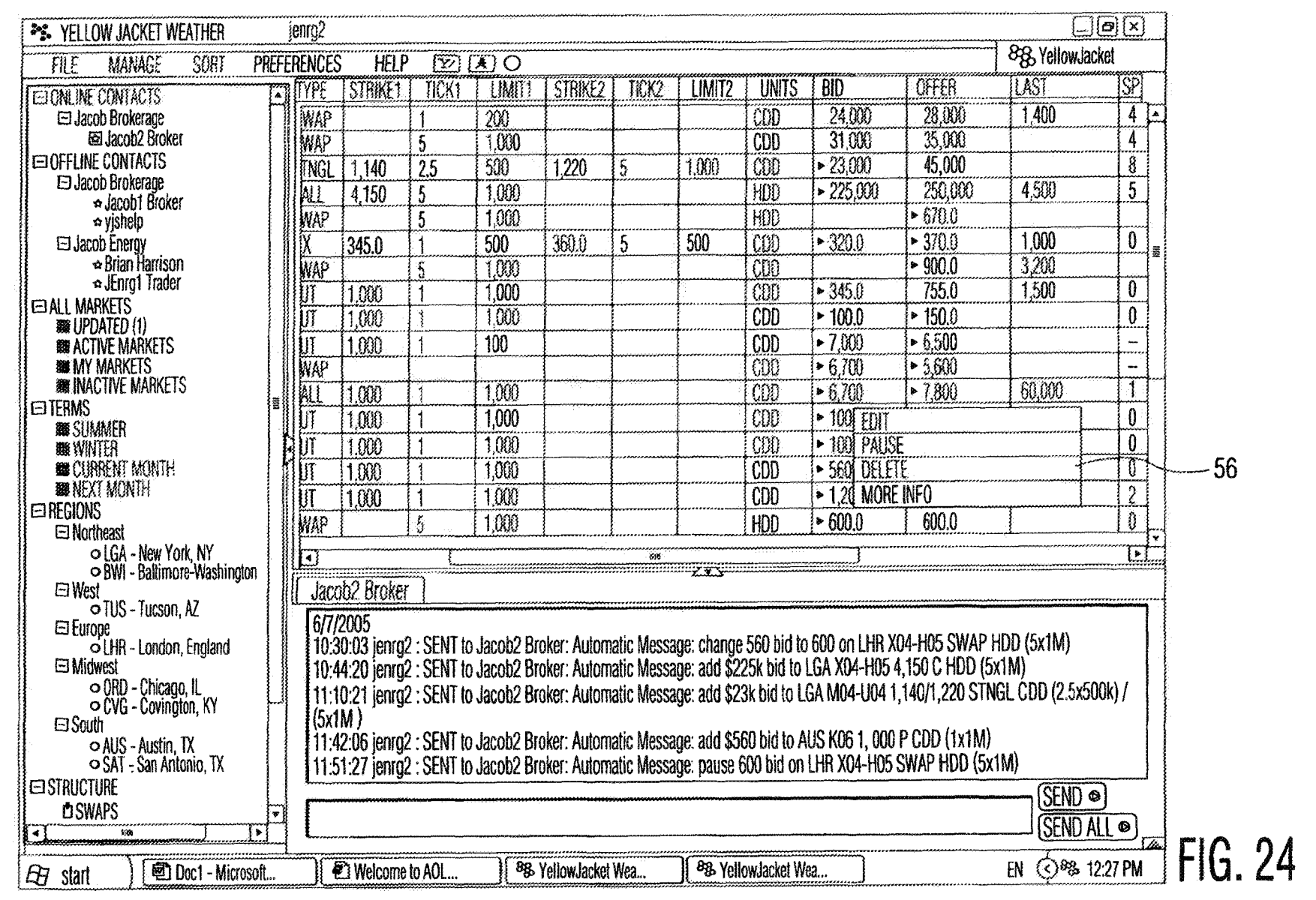

A trader can also request the modification of a particular bid or offer in a market 24 by selecting a bid or offer, such as by right clicking a bid or offer, which results in the display of a trader bid/offer edit menu 56, as shown in FIG. 24. The trader bid/offer edit menu 56 allows the trader to request the broker to edit, pause or delete a particular bid or offer. For example, if the trader selects the edit button in the trader bid/offer edit menu 56, an input screen is displayed which allows the trader to input a new value for the bid or offer. Once the edit request is input, a message is automatically sent to the broker requesting the edit, at which time the broker can use the previously described broker bid/offer edit menu 39 to make the appropriate changes to the bid or offer in the broker whiteboard 22. The broker can then choose to send the updated market information back to the trader to show that the edit has been done, using the "ALL", "MINE", "BBO" or "INT" buttons, as previously described.

Figure 25:
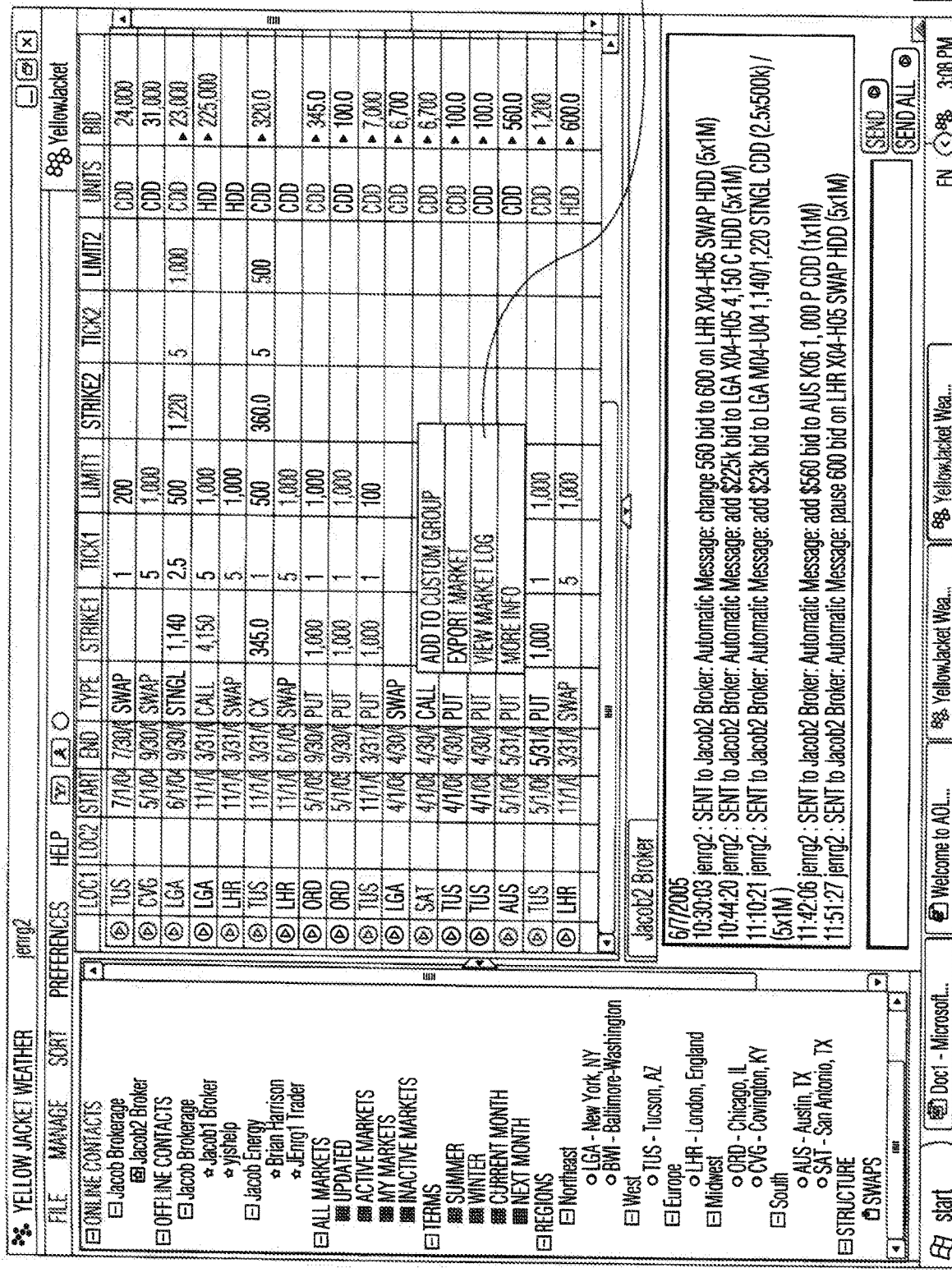
FIG. 25 shows a market options menu provided in a trader interface according to an exemplary embodiment of the present invention.

The trader graphical interface 50 may also provide the trader with the ability to add a market to a custom group, export a market, or view a market log. For example, if a trader selects a market, such as by right clicking a market, a market options menu 58 may be displayed, as shown in FIG. 25. By selecting the "ADD TO CUSTOM GROUP" button in the market options menu 58, the trader may add the selected market to previously defined market groups or to a newly created market group. The trader may be given the option to export and display the selected market string in various formats in an Excel spreadsheet. The trader may then copy the string into an instant message or e-mail to be sent to a third party. The "EXPORT MARKET" button allows a trader to take either an individual market or all markets in the current display and export and convert the market data into one of various formats for viewing or accessing data from other applications. The appropriate format is selected by the trader at the time of export. In another embodiment of the invention, a copy market string may be provided which allows a simple conversion of the market into a text string, which can be added to the operating system's clipboard for easy access for "pasting" into other applications. When a trader selects the "VIEW MARKET LOG" button in the market options menu 58, a log of all the activities that previously took place in the selected market is displayed based on the information stored the trader database 45.

Figure 26:
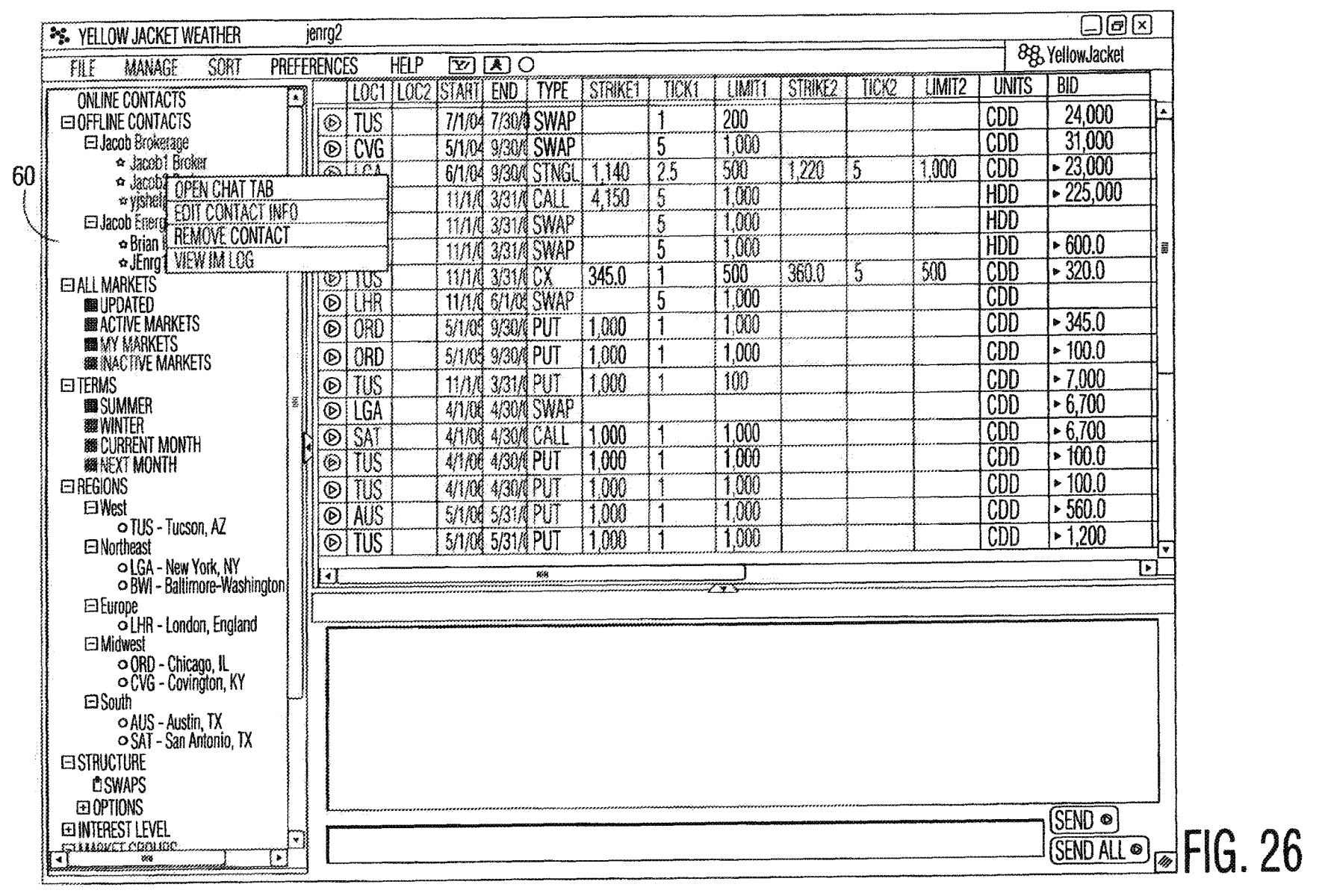
Figure 27:
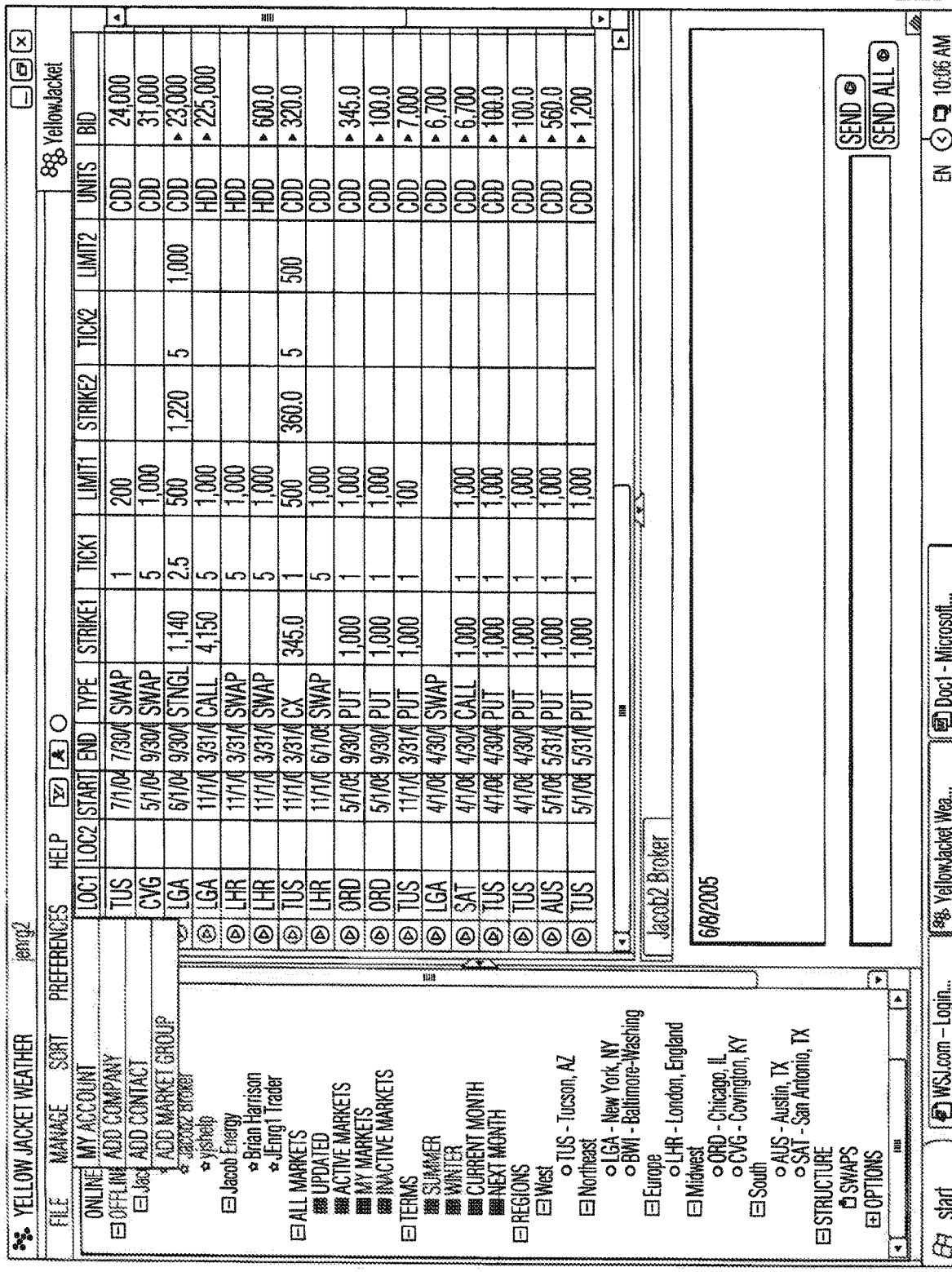
FIG. 27 shows a pull down menu for adding contacts to a contact list in the trader interface according to an exemplary embodiment of the present invention.

The trader whiteboard 52 also provides a navigational bar 60, as shown in FIG. 26. The navigational bar 60 preferably allows a trader to access information regarding or initiate communication with chosen contacts, such as traders and other brokers. For example, as shown in FIG. 26, selecting the broker "Jacob2 Broker", such as by right-clicking on "Jacob2 Broker" as listed in the navigational bar 60, results in the display of a menu item, which allows the broker to communicate with "Jacob2 Broker" and/or access information regarding "Jacob2 Broker". One option in the menu item is to open a chat tab in the instant messaging screen 56, which allows for the trader to communicate with the contact of interest using the instant messaging screen 56. Other options may be to edit contact information, remove the contact from the contacts list, and view an instant message log relating to the particular contact. New contacts may be added to the contacts list by clicking on the "Manage" button located on the top of the broker graphical interface 20, which then provides a pull down menu for adding contacts to the contact list, as shown in FIG. 27. For example, the pull down menu may allow the broker to add a new contact, company or trader group to the contact list.

The navigational bar 60 also allows the trader to choose which markets to display in the trader whiteboard 52. By selecting a particular broker contact, only those markets in which the selected broker contact is involved are displayed in the trader whiteboard 52. The trader may choose which markets to display based on additional factors, such as, for example, whether the markets are active, paused, archived or updated, in which terms the markets are active (summer, winter, current month, next month), to which regions the markets are related (northeast, midwest, south, Europe, west, mountain states), or the structure of the markets (swap, options, baskets). The options listed in the navigational bar 52 shown in the figures are merely exemplary, and any other options may be provided to allow the trader to choose which markets to display in the trader whiteboard 22.

The trader and broker databases described herein provide significant advantages in their ability to store historical data relating to financial product markets. By storing and dynamically updating such data in real time, the system 1 is able to provide market logs for both traders and brokers. Thus, for instance, a trader receiving information from multiple brokers regarding multiple markets can analyze such data more effectively and make quicker decisions within the market environment. Similarly, brokers can keep track of instant message logs, trader bids and offers, and other historical data regarding a particular market.

It should be appreciated that the trader and broker graphical interfaces of the present invention are not limited by the features and appearance as described herein. In this regard, a variety of third party systems and software may be used in place of the trader and graphical interfaces described herein, which benefit from the advantages provided by the trader and broker databases and other software components of the present invention. For example, in an alternative embodiment of the invention, third party spreadsheet software, such as Microsoft Excel, may be configured to function with the API of the system 1 so that financial product data may be displayed in any suitable format in a spreadsheet application.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A virtual over-the-counter exchange system comprising:

a broker database operatively coupled to a first interactive graphical user interface (GUI) that is accessible by a broker and one or more other brokers within a firm;

a virtual trader database operatively coupled to a second interactive GUI that is accessible by one or more designated traders; and a computing device comprising a processor operatively coupled to a memory, the memory storing computer-readable instructions that, when executed by the processor, cause the computing device to:

receive, via a product creation wizard comprising a window of the first interactive GUI, entry of a market structure and financial product information for one or more products, the first interactive GUI for use by the broker and the one or more other brokers within the firm;

automatically store the market structure and the financial product information in the broker database in real time;

assign the market structure a unique identification number;

query the virtual trader database for the unique identification number to determine whether the virtual trader database already includes the market structure;

upon determining that the virtual trader database already includes the market structure, send only the financial product information to the virtual trader database;

display, via a broker whiteboard comprising a window of the first interactive GUI, one or more markets on a single screen, each market corresponding to a product of the one or more products;

receive, via the broker whiteboard, first updates to one or more fields of financial product information from the broker and second updates to the one or more fields from the one or more other brokers within the firm;

dynamically display, via the broker whiteboard, the first updates and the second updates in real time as they are received, wherein the first updates are visually distinguishable from the second updates in the broker whiteboard;

send one or more of the first updates and the second updates to the virtual trader database; and dynamically display, via a trader whiteboard comprising a window of the second interactive GUI, one or more of the first updates and the second updates in real time as they are received by the broker whiteboard and an indication of the one or more of the first updates and the second updates.

2. The system of claim 1, wherein the first interactive GUI further comprises supplementary data entry fields generated based upon the financial product information entered via the product creation wizard.

3. The system of claim 2, wherein the supplementary data entry fields are generated based upon a structure type of at least one of the one or more products.

4. The system of claim 2, wherein the supplementary data entry fields are generated based upon an index type of at least one of the one or more products.

5. The system of claim 1, wherein the product creation wizard comprises a pull-down menu having a list of options for selection of the financial product information.

6. The system of claim 1, wherein information entered in the product creation wizard comprises a structure code related to the financial product information being entered.

7. The system of claim 1, wherein the first interactive GUI further comprises:

a contact window comprising a list of selectable contacts including the one or more designated traders, wherein selection of a contact enables one or more of receipt of information related to a selected contact, communication with a selected contact, and display of the broker whiteboard involving the selected contact;

an instant messaging window configured to communicate with one or more selected contacts; and a market filter window comprising a list of selectable market factors, wherein selection of one or more among the selectable market factors causes only the selected market factors to be displayed in the broker whiteboard.

8. The system of claim 7, wherein the selectable market factors comprise at least one of market status, market term, market location, and market structure.

9. The system of claim 1, wherein the first interactive GUI further comprises:

an add bid button in the broker whiteboard, the add bid button generating a separate add bid interface upon selection of the add bid button, the add bid interface comprising add bid data entry fields for entry of a bid and a bid amount.

10. The system of claim 1, wherein the first interactive GUI further comprises:

an add offer button in the broker whiteboard, the add offer button generating a separate add offer interface upon selection of the add offer button, the add offer interface comprising add offer data entry fields for entry of an offer and an offer amount.

11. The system of claim 1, wherein the first interactive GUI further comprises:

a bid/offer edit menu, the bid/offer edit menu being generated upon selection of a bid or offer displayed in the broker whiteboard, the bid/offer edit menu facilitating an edit, addition, pause, or deletion of the selected bid or offer.

12. The system of claim 1, wherein the first interactive GUI further comprises:

new market data entry fields for entry of new market financial product information to define a new product, the new market data entry fields being generated upon selection of a new market derivation button within the broker whiteboard, the new market data entry fields being at least partially entered based upon a market of the broker whiteboard.

13. The system of claim 1, wherein the first interactive GUI further comprises:

a post trade button in the broker whiteboard, the post trade button generating a trade entry interface upon selection of the post trade button, the trade entry interface comprising trade data entry fields for entry of trade information.

14. The system of claim 13, wherein the trade information comprises at least one of a seller of a product, a buyer of a product, a trade amount, a tick, a limit, and a clearing mechanism.

15. The system of claim 7, wherein the first interactive GUI further comprises:

market update selection tools which, upon being selected, selectively distributes market updates for a selected market to users.

16. The system of claim 15, wherein the market update selection tools comprise one or more of: i) an all button, selection of which sends the market updates to all clients of a market maker firm; ii) a personal button, selection of which sends the market updates to all contacts in the list of selectable contacts; iii) a best button, selection of which sends the market updates to traders with a best bid and offer in the selected market; and iv) an interested button, selection of which sends the market updates to a list of interested traders in the selected market.

17. The system of claim 16, wherein the first interactive GUI further comprises:
an interested users input interface for selecting the list of interested traders from the list of selectable contacts.

18. The system of claim 1, wherein the first interactive GUI further comprises:
market action selection tools for archiving, pausing, and reactivating a selected market.

19. The system of claim 1, wherein the first interactive GUI further comprises:
a basket button, selection of which generates a basket interface, the basket interface i) grouping a collection of selected markets to form a basket; ii) comprising basket data entry fields for entry of basket information and selected market information; and iii) generating a basket string based on the basket information entered in the basket data entry fields.

20. The system of claim 19, wherein the basket string comprises: i) the basket information comprising at least a basket name; ii) a market string for each selected market; iii) an indication as to whether each selected market is to be purchased or sold; iv) and a tick, limit, start date, and end date of each selected market.

21. The system of claim 19, wherein the first interactive GUI further comprises:
a basket window that displays one or more baskets, the collection of selected markets that form the one or more baskets, and bids and offers in each of the selected markets of each of the one or more baskets.

22. The system of claim 7, wherein the contact window and the market filter window share a joint contact-market filter window.

23. The system of claim 1, wherein a market is indicated as updated to market makers sharing the virtual over-the-counter exchange system when the market is updated by a market maker.

24. The system of claim 23, wherein the market maker comprises the broker.

25. The system of claim 7, wherein selection of a contact from the list of selectable contacts on the contact window results in a filtered display of markets in which the selected contact has at least one of a bid and an offer.

26. The system of claim 1, wherein the financial product information comprises one or more of product term, start date, end date, location, time period, structure type, units, $Tick/unit, floor/cap, index type, and index variable.

* * * * *